United States Patent
Kaneoka et al.

(10) Patent No.: US 9,444,572 B2
(45) Date of Patent: Sep. 13, 2016

(54) TRANSMISSION DEVICE AND TRANSMISSION METHOD

(71) Applicant: FUJITSU LIMITED, Kawasaki-shi, Kanagawa (JP)

(72) Inventors: Tomohiro Kaneoka, Kawasaki (JP); Norifumi Shukunami, Yokohama (JP); Hiroki Oi, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 159 days.

(21) Appl. No.: 14/033,778

(22) Filed: Sep. 23, 2013

(65) Prior Publication Data

US 2014/0126903 A1    May 8, 2014

(30) Foreign Application Priority Data

Nov. 6, 2012  (JP) ................................. 2012-244828

(51) Int. Cl.
*H04J 14/02*    (2006.01)

(52) U.S. Cl.
CPC ........ *H04J 14/0212* (2013.01); *H04J 14/0205* (2013.01); *H04J 14/0208* (2013.01); *H04J 14/0209* (2013.01)

(58) Field of Classification Search
CPC ................................................... H04J 14/0205
See application file for complete search history.

(56) References Cited

U.S. PATENT DOCUMENTS

| | | | |
|---|---|---|---|
| 6,323,975 B1* | 11/2001 | Kurki | ................................. 398/9 |
| 2003/0113055 A1* | 6/2003 | Zhao et al. | ..................... 385/16 |
| 2009/0220242 A1 | 9/2009 | Oi et al. | |
| 2012/0002964 A1* | 1/2012 | Takatsu et al. | ................. 398/50 |
| 2012/0308179 A1* | 12/2012 | Jiang | ................... H04J 14/0212 385/16 |
| 2013/0022355 A1 | 1/2013 | Charlet et al. | |
| 2013/0045006 A1* | 2/2013 | Dahan et al. | .................... 398/34 |
| 2013/0077973 A1* | 3/2013 | Xie et al. | ........................ 398/65 |

FOREIGN PATENT DOCUMENTS

| | | |
|---|---|---|
| JP | 2005-143036 | 6/2005 |
| JP | 2006-186538 | 7/2006 |
| JP | 2009-212584 | 9/2009 |
| JP | 2012-23781 | 2/2012 |
| WO | 2011/113679 A1 | 9/2011 |

OTHER PUBLICATIONS

CNOA—Office Action of Chinese Patent Application No. 201310461149.5 dated Feb. 1, 2016, with full English Translation of the Office Action.

JPOA—Office Action of Japanese Patent Application No. 2012-244828 dated Jun. 7, 2016, with English translation.

\* cited by examiner

*Primary Examiner* — Shi K Li
(74) *Attorney, Agent, or Firm* — Fujitsu Patent Center

(57) ABSTRACT

A transmission device includes: optical transmitters configured to transmit optical signals of different wavelengths; optical couplers configured to multiplexing the optical signals transmitted from the optical transmitters; and a wavelength selective switch configured to multiplex multiplexed optical signals obtained by multiplexing by the couplers, wherein optical signals, a wavelength interval between which is less than a predetermined value, are transmitted to separate optical couplers of the optical couplers, among the optical signals.

9 Claims, 25 Drawing Sheets

FIG. 14

| CHANNEL NUMBER (ch) | WAVELENGTH |
|---|---|
| 1 | $\lambda 1$ |
| 2 | $\lambda 2$ |
| 3 | $\lambda 3$ |
| ⋮ | ⋮ |
| 40 | $\lambda 40$ |

TRANSMISSION DEVICE AND TRANSMISSION METHOD

CROSS-REFERENCE TO RELATED APPLICATION

This application is based upon and claims the benefit of priority of the prior Japanese Patent Application No. 2012-244828, filed on Nov. 6, 2012, the entire contents of which are incorporated herein by reference.

FIELD

A certain aspect of embodiments described herein relates to a transmission device and a transmission method.

BACKGROUND

The increase of the demand for communications has widely defused optical networks using Wavelength Division Multiplexing (WDM) technology. The wavelength division multiplexing technology is technology that multiplexes and transmits optical signals of different wavelengths. The wavelength division multiplexing technology enables to multiplex and transmit 40 waves of optical signals with a transmission rate of 40 (Gbps) as a wavelength-multiplexed optical signal (hereinafter, described as a multiplexed optical signal) with a transmission rate of 1.6 (Tbps).

There has been known an optical add-drop multiplexer referred to as a ROADM (Reconfigurable Optical Add-Drop Multiplexer) or the like as a transmission device using the WDM technology. The optical add-drop multiplexer includes optical transceivers referred to as a transponder or the like. The optical transceivers transmit/receive optical signals of different wavelengths to/from an external network.

The optical add-drop multiplexer multiplexes optical signals of different wavelengths input from the optical transceivers and transmit them to another node as a multiplexed optical signal. Moreover, the optical add-drop multiplexer receives a multiplexed optical signal from another node, and demultiplexes the multiplexed optical signal into one or more optical signals of desired wavelengths and output them to one or more optical transceivers. The optical add-drop multiplexer adds and drops the optical signal of a desired wavelength by the above described process.

The optical add-drop multiplexer includes a Wavelength Selective Switch (WSS) in each network degree to multiplex optical signals into a multiplexed optical signal or to demultiplex a multiplexed optical signal into optical signals of respective wavelengths. Here, the network degree is a transmission route between the optical add-drop multiplexer and another node to be connected.

Regarding the optical add-drop multiplexer, Japanese Patent Application Publication No. 2012-23781 (Patent Document 1) discloses providing wavelength selective switches with different frequency intervals for wavelength selection to add and drop optical signals with different transmission rates. Japanese Patent Application Publication No. 2005-143036 (Patent Document 2) discloses multiplexing optical signals with wavelengths of which the channel numbers are even numbers and optical signals with wavelengths of which the channel numbers are odd numbers by different optical multiplexers and demultiplexing them by different optical demultiplexers.

SUMMARY

According to an aspect of the present invention, there is provided a transmission device including: optical transmitters configured to transmit optical signals of different wavelengths; optical couplers configured to multiplexing the optical signals transmitted from the optical transmitters; and a wavelength selective switch configured to multiplex multiplexed optical signals obtained by multiplexing by the couplers, wherein optical signals, a wavelength interval between which is less than a predetermined value, are transmitted to separate optical couplers of the optical couplers, among the optical signals.

According to an aspect of the present invention, there is provided a transmission method including: transmitting optical signals, a wavelength interval between which is less than a predetermined value, to separate optical couplers, among optical signals of different wavelengths; and multiplexing and transmitting multiplexed optical signals, which are obtained by multiplexing by the optical couplers, by a wavelength selective switch.

The object and advantages of the invention will be realized and attained by means of the elements and combinations particularly pointed out in the claims. It is to be understood that both the foregoing general description and the following detailed description are exemplary and explanatory and are not restrictive of the invention, as claimed.

BRIEF DESCRIPTION OF DRAWINGS

FIG. 14 is a table illustrating a setting table;

DESCRIPTION OF EMBODIMENTS

An Arrayed Waveguide Grating (AWG) is an exemplary multiplexing unit to multiplex optical signals to be added. The arrayed waveguide grating has a fixed transmissible wavelength of a light beam determined for each port, and thus has little flexibility in wavelength settings.

To achieve a Colorless function that removes the above described restrictions on wavelength, the wavelength selective switches may be used as a multiplexing unit as described in Patent Document 1. However, the wavelength selective switch is high-cost, and the device cost therefore increases.

Figure 1:
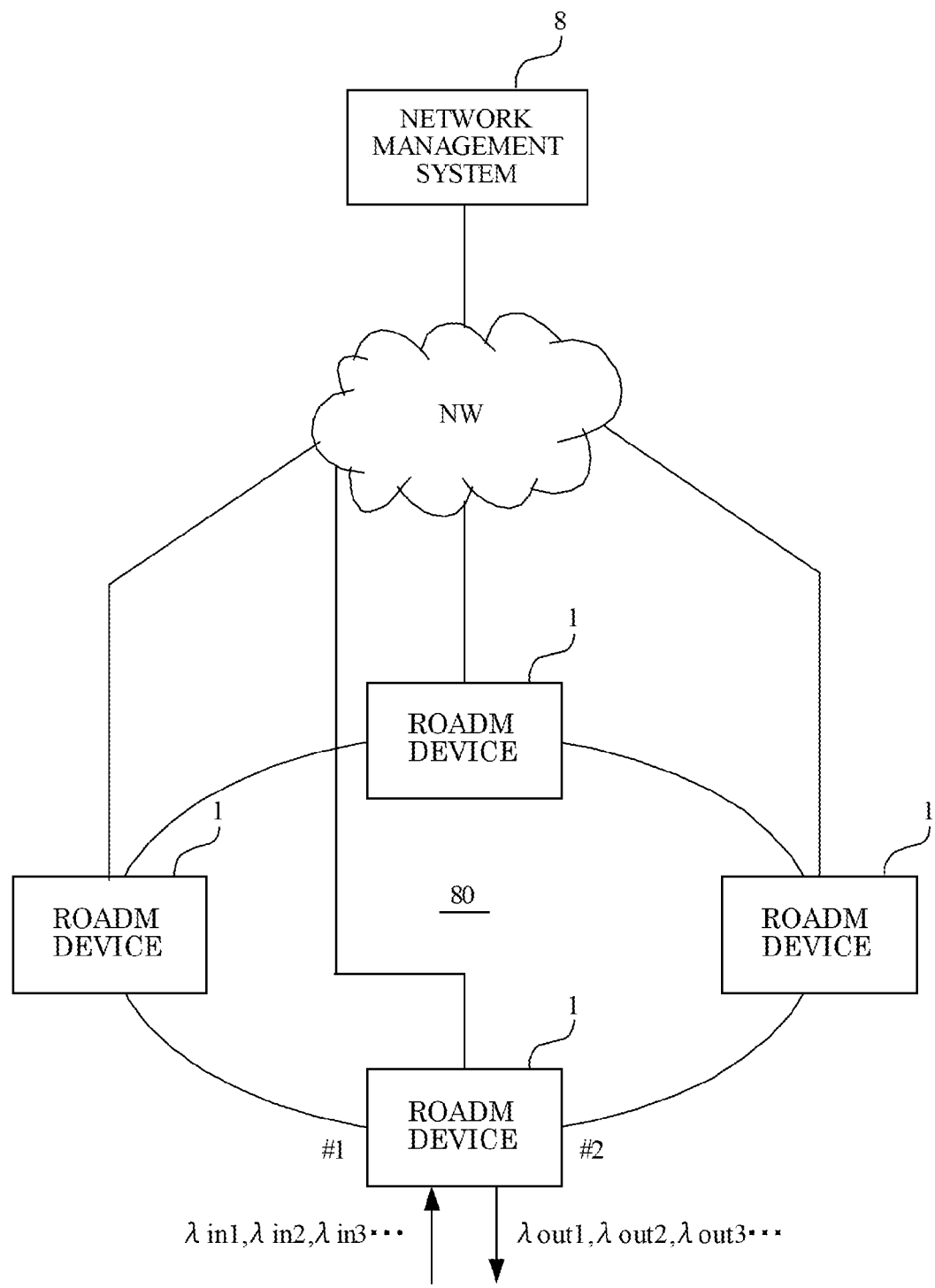
FIG. 1 is a configuration diagram illustrating a network configuration of a transmission device.

FIG. 1 is a configuration diagram illustrating a network configuration of a transmission device. The present specification describes a ROADM device as a transmission device, but does not intend to suggest any limitation.

Transmission devices 1 are interconnected by optical fibers to form, for example, a ring type network 80. The transmission device 1 has two network degrees #1, #2 connecting the transmission device 1 and the transmission devices 1 at the adjoining nodes.

A network management system (NMS) 8 manages the transmission devices 1 in the network 80. The network management system 8 is coupled to the transmission devices 1 through a monitoring control network NW such as a LAN (Local Area Network).

Each of the transmission devices 1 receives optical signals of wavelengths $\lambda in1$, $\lambda in2$, $\lambda in3$ . . . and wavelength-multiplexes and transmits the optical signals to the adjoining node. Each of the transmission devices 1 demultiplexes a multiplexed optical signal transmitted from the adjoining node into optical signals of wavelengths $\lambda out1$, $\lambda out2$, $\lambda out3$ . . . , and outputs them. Therefore, optical signals of desired wavelengths are transmitted between the transmission devices 1 at desired nodes by assigning channels to the wavelengths of optical signals input to/output from the transmission device 1 with use of the network management system 8. The input of optical signals $\lambda in1$, $\lambda in2$, $\lambda in3$ from the outside to the transmission device 1 is described as "add", and the output of optical signals $\lambda out1$, $\lambda out2$, $\lambda out3$ from the transmission device 1 to the outside is described as "drop".

Figure 2:
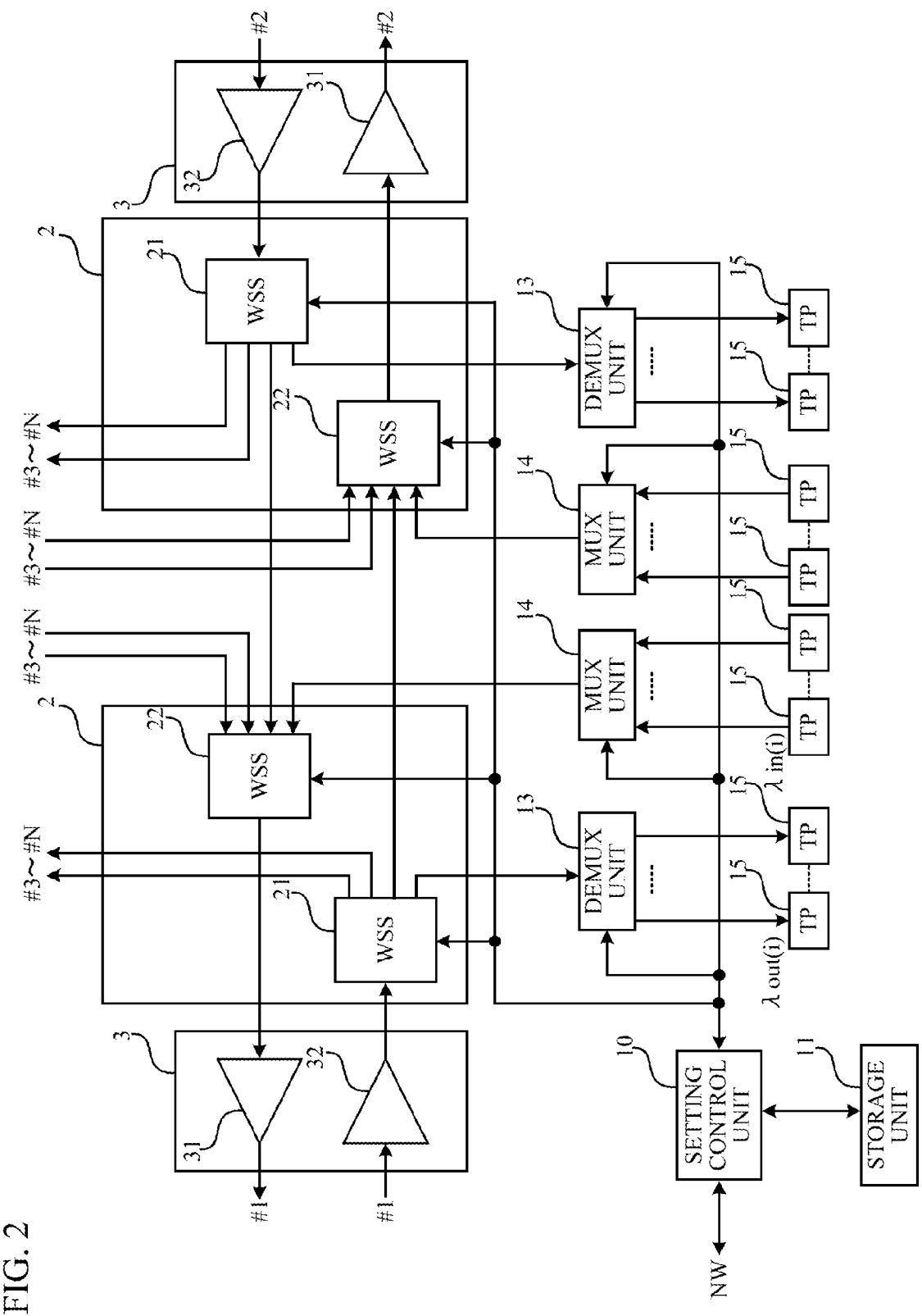
FIG. 2 is a configuration diagram illustrating a functional configuration of the transmission device.

FIG. 2 is a configuration diagram illustrating a functional configuration of the transmission device 1. The transmission device 1 includes a setting control unit 10, a storage unit 11, amplifier units 3, switch units 2, DEMUX units 13, MUX units 14, and optical transponders (TP) 15. The switch unit 2, the amplifier unit 3, the DEMUX unit 13, and the MUX unit 14 are provided to each of network degrees #1~#N. FIG. 2 illustrates only functional elements in network degrees #1 and #2, but functional elements in other network degrees are configured in the same manner.

The amplifier unit 3 includes an input side amplifier (pre-amplifier) 32 that amplifies an input multiplexed optical signal from a corresponding network degree of network degrees #1~#N and an output side amplifier (post-amplifier) 31 that amplifies an output multiplexed optical signal to a corresponding network degree of network degrees #1~#N. The switch unit 2 includes an input side wavelength selective switch (WSS) 21 and an output side wavelength selective switch (WSS) 22.

The input side wavelength selective switch 21 selects wavelengths included in a multiplexed light beam input from the input port, and multiplexes and outputs light beams of the selected wavelengths from the output ports. The input port of the input side wavelength selective switch 21 is coupled to the output port of the input side amplifier 32, while the output ports thereof are coupled to the DEMUX unit 13 and the input ports of the output side wavelength selective switches 22 of other network degrees of network degrees #1~#N.

This configuration makes the input side wavelength selective switch 21 demultiplex an input multiplexed optical signal from the input side optical amplifier 32 into optical signals of selected wavelengths and output them to the DEMUX unit 13 and the wavelength selective switches 22 of other network degrees of network degrees #1~#N. An optical splitter may be used instead of the input side wavelength selective switch 21.

The output side wavelength selective switch 22 selects wavelengths of light beams input from the input ports, and multiplexes the light beams of the selected wavelengths and outputs them from the output port. The inputs ports of the output side wavelength selective switch 22 are coupled to the MUX unit 14 and the output ports of the input side wavelength selective switches 21 of other network degrees of network degrees #1~#N, while the output port thereof is coupled to the input port of the output side amplifier 31. This configuration makes the output side wavelength selective switch 22 multiplex an input multiplexed optical signal from the MUX unit 14 with input multiplexed optical signals from the input side wavelength selective switches 21 of other network degrees of network degrees #1~#N.

A multiplexed optical signal output from the output side wavelength selective switch 22 is amplified by the output side amplifier 31 and transmitted to a corresponding network degree of network degrees #1~#N. The wavelength selective switches 21, 22 select wavelengths in accordance with the settings from the setting control unit 10.

The setting control unit (control unit) 10 is an arithmetic processing circuit such as a CPU (Central Processing Unit), and controls the transmission devices 1 based on a predetermined program. The setting control unit 10 communicates with the network management system 8 through the monitoring control network NW. The setting control unit 10 is not limited to a unit that functions by software, and may be a unit that functions by a hardware device such as an integrated circuit for a specific use.

The storage unit 11 is, for example, a memory, and stores a setting table in which assignment of channel numbers to wavelengths of optical signals is registered. The setting control unit 10 configures the settings of the wavelength selective switches 21, 22 by referring to the setting table.

The DEMUX unit 13 demultiplexes a multiplexed signal output from the input side wavelength selective switch 21 into optical signals of respective wavelengths $\lambda out(i)$ to drop optical signals, and outputs them to the optical transponders 15. The MUX unit 14 multiplexes optical signals of respective wavelengths $\lambda in(i)$ input from an external device through the optical transponders 15 to add the optical signals, and outputs them to the input port of the output side wavelength selective switch 22.

Figure 3:
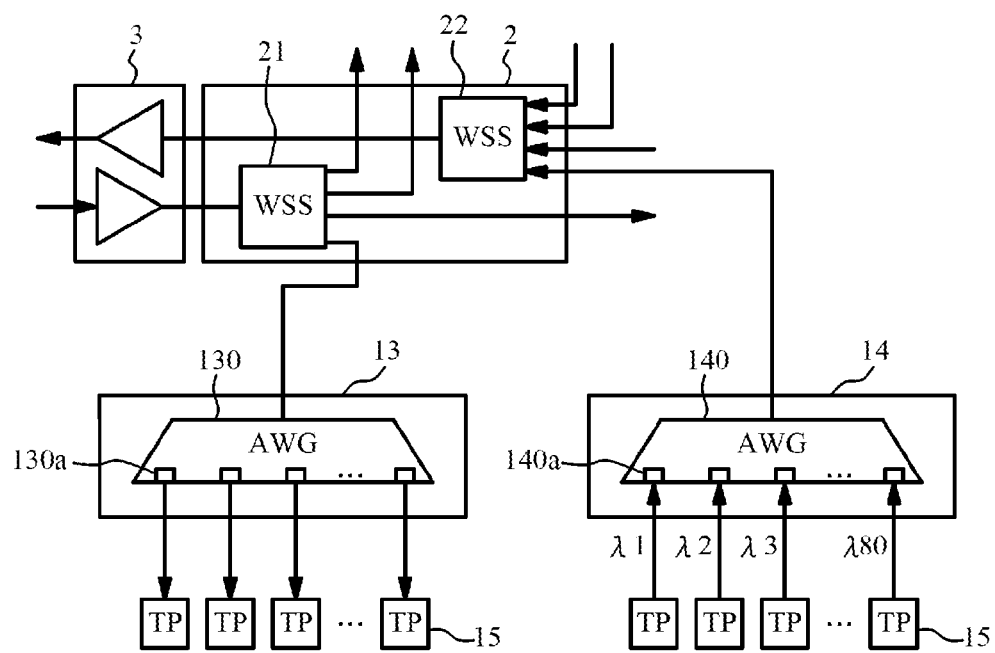
FIG. 3 is a configuration diagram illustrating configurations of an MUX unit and a DEMUX unit of a transmission device in accordance with a first comparative example.

Several configurations may be applied to the DEMUX unit 13 and the MUX unit 14. FIG. 3 is a configuration diagram illustrating configurations of the MUX unit 14 and the DEMUX unit 13 of the transmission device 1 in accordance with the first comparative example. FIG. 3 illustrates a ROADM device capable of adding and dropping 80 waves of optical signals. In FIG. 3, the common components are indicated by the same reference numerals as used for FIG. 2, and the description thereof is omitted. This applies to the description hereinafter.

The DEMUX unit 13 includes an arrayed waveguide grating (AWG) 130, and the MUX unit 14 includes an arrayed waveguide grating (AWG) 140. The arrayed waveguide grating 140 includes input ports 140a coupled to the optical transponders 15. The arrayed waveguide grating 130 includes output ports 130a coupled to the optical transponders 15.

The arrayed waveguide gratings 140, 130 have fixed wavelengths $\lambda 1$ to $\lambda 80$ of input/output light beams for each of the ports 140a, 130a. Therefore, the setting control unit 10 cannot set the wavelength to the arrayed waveguide gratings 140, 130. Therefore, the transmission device 1 of the first comparative example has little flexibility in the wavelength setting.

Figure 4:
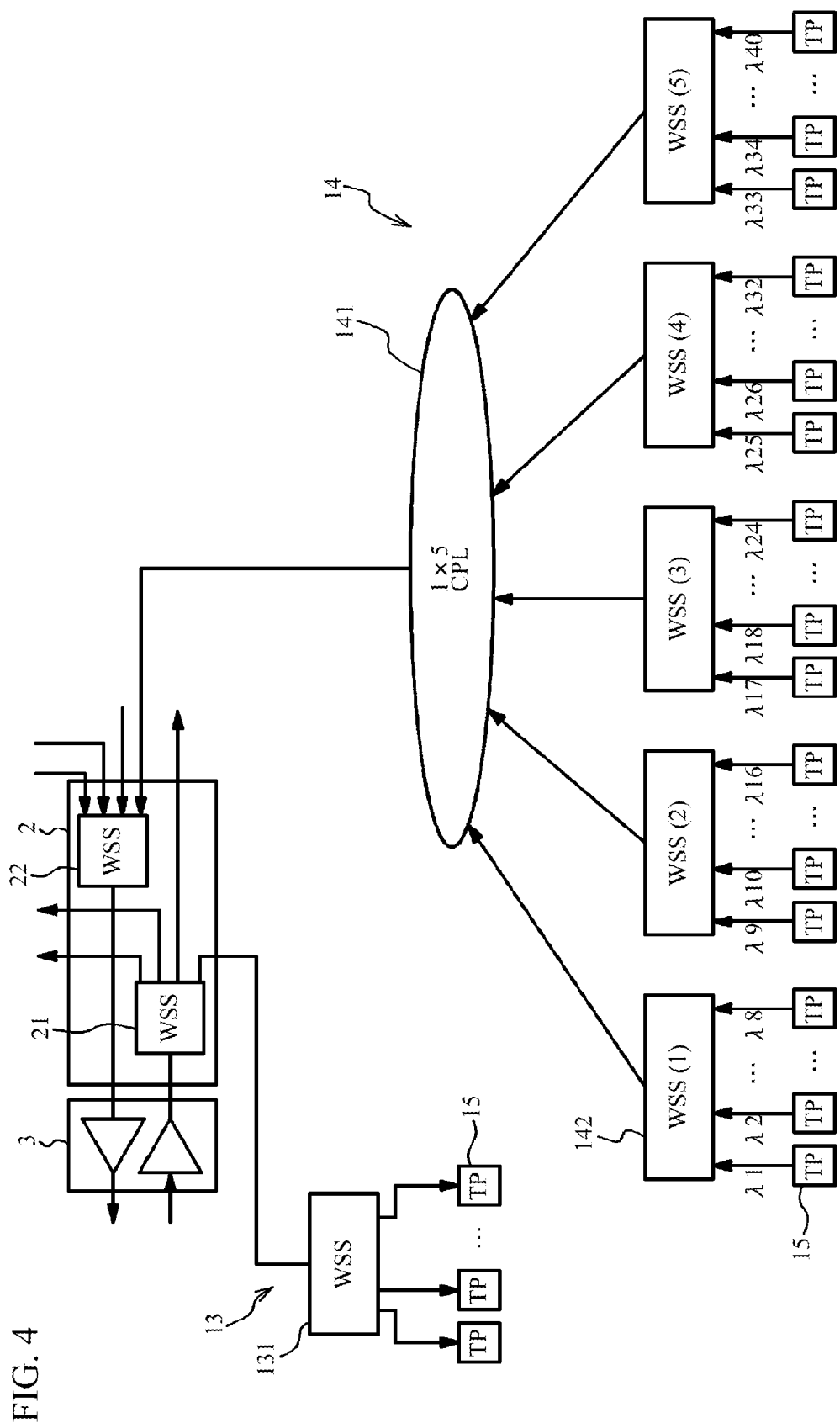
FIG. 4 is a configuration diagram illustrating configurations of an MUX unit and a DEMUX unit of a transmission device (40-wave ROADM device) in accordance with a second comparative example.

To achieve a colorless function that removes the above described restrictions on wavelength, a wavelength selective switch may be used as a multiplexing unit instead of the arrayed waveguide gratings 140, 130. FIG. 4 is a configuration diagram illustrating configurations of the MUX unit 14 and the DEMUX unit 13 of the transmission device (40-wave ROADM device) 1 in accordance with a second comparative example.

The MUX unit 14 includes an optical coupler 141 and wavelength selective switches (1)~(5) 142, and the DEMUX unit 13 includes a wavelength selective switch 131. The wavelength selective switches (1)~(5) 142 are coupled to the optical transponders 15, and receive optical signals. For example, the wavelength selective switch (1) 142 receives optical signals of wavelengths $\lambda 1 \sim \lambda 8$, and the wavelength selective switch (5) 142 receives optical signals of wavelengths $\lambda 33 \sim \lambda 40$. The wavelengths selected in the wavelength selective switches (1) (5) 142 are set by the setting control unit 10.

Each of the wavelength selective switches (1)~(5) 142 multiplexes and outputs the input eight optical signals to the optical coupler 141. The optical coupler 141 includes one input port and five output ports (hereinafter, described as "1×5"). The optical coupler 141 multiplexes and outputs multiplexed optical signals, which are obtained by multiplexing by the wavelength selective switches (1)~(5) 142, to the output side wavelength selective switch 22.

The multiplexed optical signal output from the input side wavelength selective switch 21 is input to the wavelength selective switch 131. The wavelength selective switch 131 is coupled to the optical transponders 15, and demultiplexes the multiplexed optical signal into optical signals of respective wavelengths according to the settings of the setting control unit 10, and outputs them to the optical transponders 15.

The transmission device 1 in accordance with the second comparative example can select the wavelength input to/output from the MUX unit 14 and the DEMUX unit 13 by the setting control unit 10, and thus has high flexibility in the wavelength setting. On the other hand, the transmission device 1 of the second comparative example uses two or more wavelength selective switches 142, and thus the device cost is high compared to the first comparative example. The device cost increases as the number of wavelengths of optical signals to be added increases because the number of wavelength selective switches or the number of ports increases.

Figure 5:
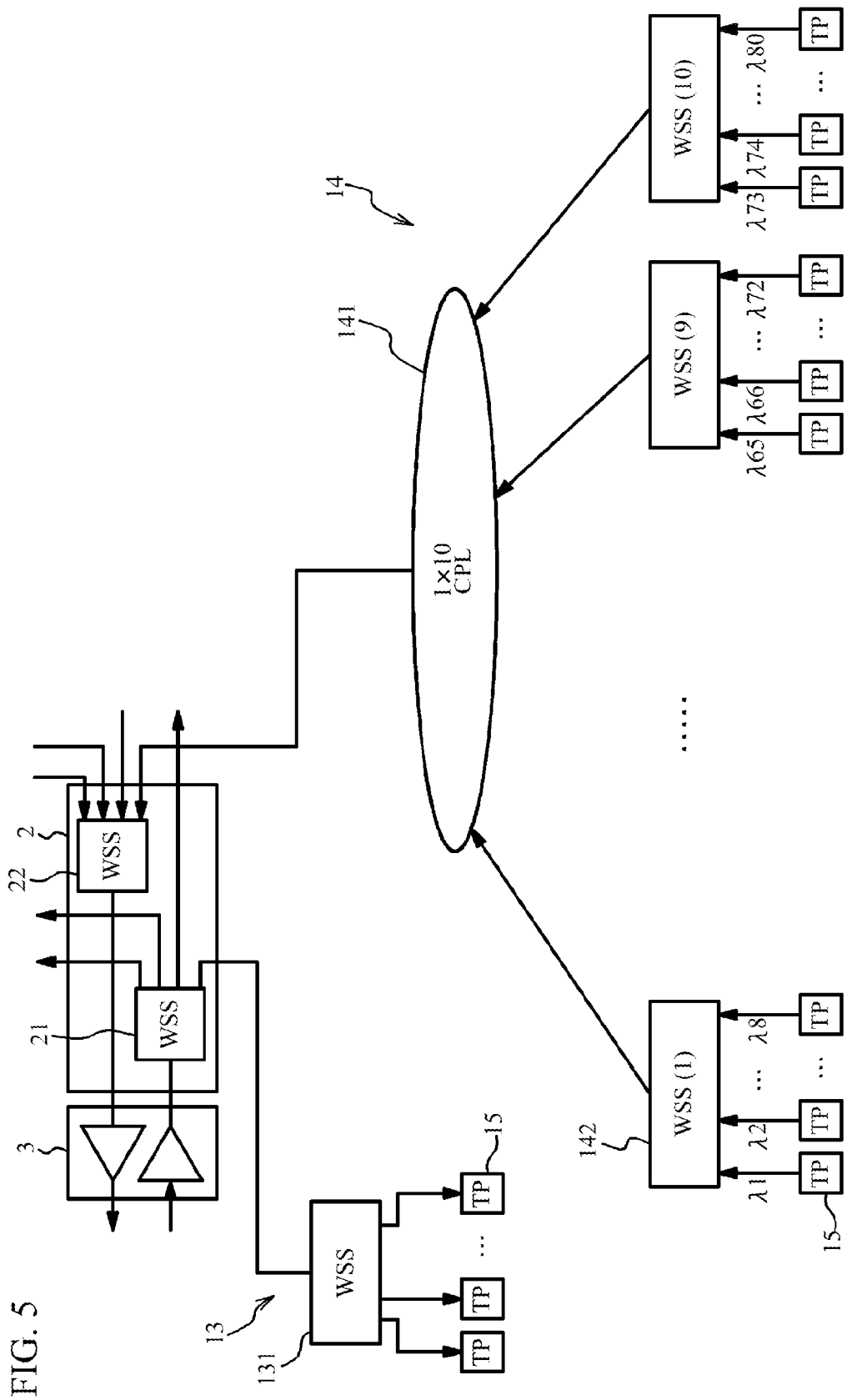
FIG. 5 is a configuration diagram illustrating configurations of an MUX unit and a DEMUX unit of a transmission device (80-wave ROADM device) in accordance with the second comparative example.

FIG. 5 is a configuration diagram illustrating configurations of the MUX unit 14 and the DEMUX unit 13 of the transmission device (80-wave ROADM device) 1 in accordance with the second comparative example. The MUX unit 14 includes the 1×10-port optical couplers 141 and ten wavelength selective switches (1)~(10) 142 that are twice as many as those included in the transmission device illustrated in FIG. 4 to add 80 waves (wavelengths $\lambda 1 \sim \lambda 80$) of optical signals. Therefore, the transmission device 1 costs approximately twice as much as that of FIG. 4 for only the MUX unit 14.

Figure 6:
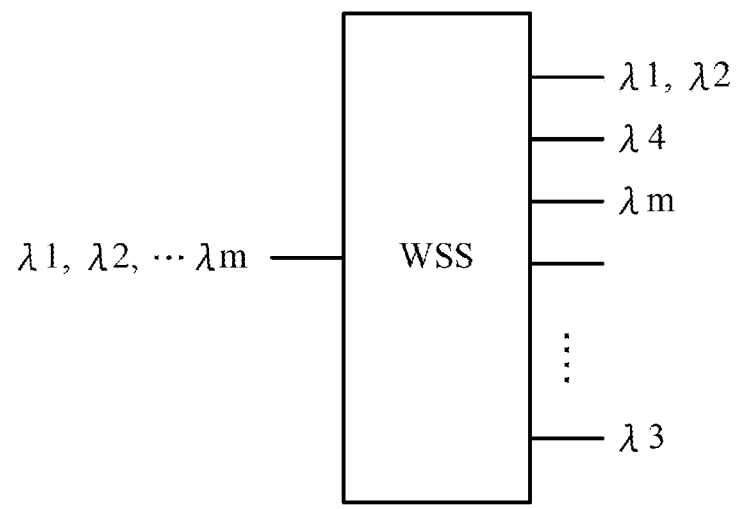
FIG. 6 is a diagram illustrating a wavelength selective switch.

Here, a description will be given of a wavelength selective switch with reference to FIG. 6 and FIG. 7. As illustrated in FIG. 6, the wavelength selective switch adds/drops optical signals of desired wavelengths $\lambda 1 \sim \lambda m$ to/from a multiplexed optical signal, and selects and outputs a desired optical signal to a desired output port to achieve a one-to-many connection function by a light beam. More specifically, the wavelength selective switch has a demultiplexing function into optical signals of respective wavelengths, a switching function of paths of optical signals of respective wavelengths, and a multiplexing function of optical signals of respective wavelengths. The wavelength selective switch can further control the power of a light beam with use of coherence of a light beam.

Figure 7:
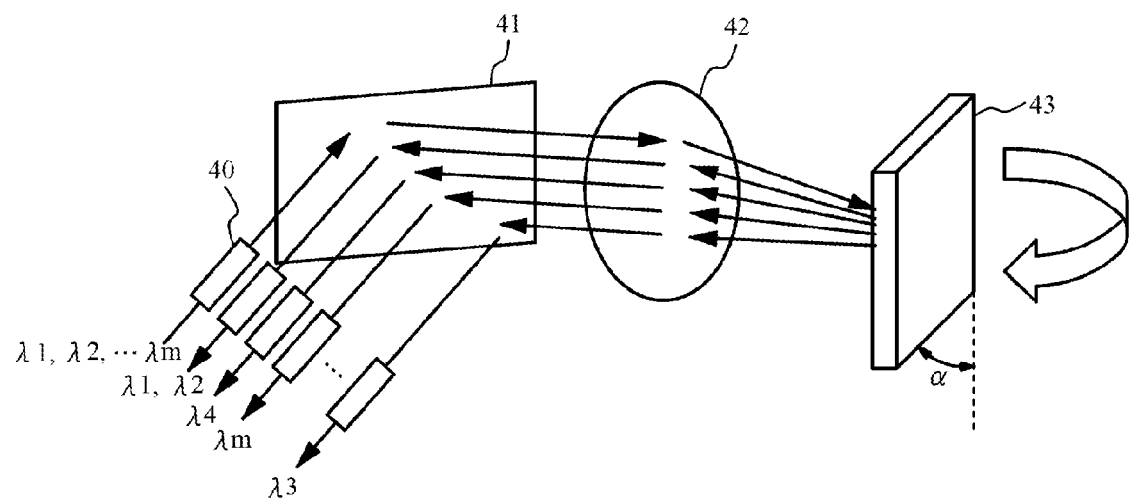
FIG. 7 is a configuration diagram illustrating a configuration of a wavelength selective switch.

As illustrated in FIG. 7, the wavelength selective switch includes a collimator 40, a diffraction grating 41, a lens 42, and a MEMS (Micro Electro Mechanical Systems) 43. The multiplexed optical signal including optical signals of wavelengths $\lambda 1 \sim \lambda m$ is input from an input port, undergoes the collimator 40 and the lens 42 to be a parallel beam, and demultiplexed into the optical signals of wavelengths $\lambda 1 \sim \lambda m$ by the diffraction grating 41.

The demultiplexed optical signals of wavelengths $\lambda 1 \sim \lambda m$ undergo the lens 42 and arrive at the MEMS 43 provided with respect to each wavelength. The MEMS 43 is, for example, a micromirror, and capable of determining an output port outputting the optical signal for each wavelength by adjusting an angle $\alpha$ of the micromirror. The optical signals of respective wavelengths undergo the lens 42, are multiplexed for each output port by the diffraction grating 41, and output from a desired output port. The output port does not have a restriction on the number of wavelengths, and thus can flexibly dispatch traffic on the millisecond time scale.

Figure 8:
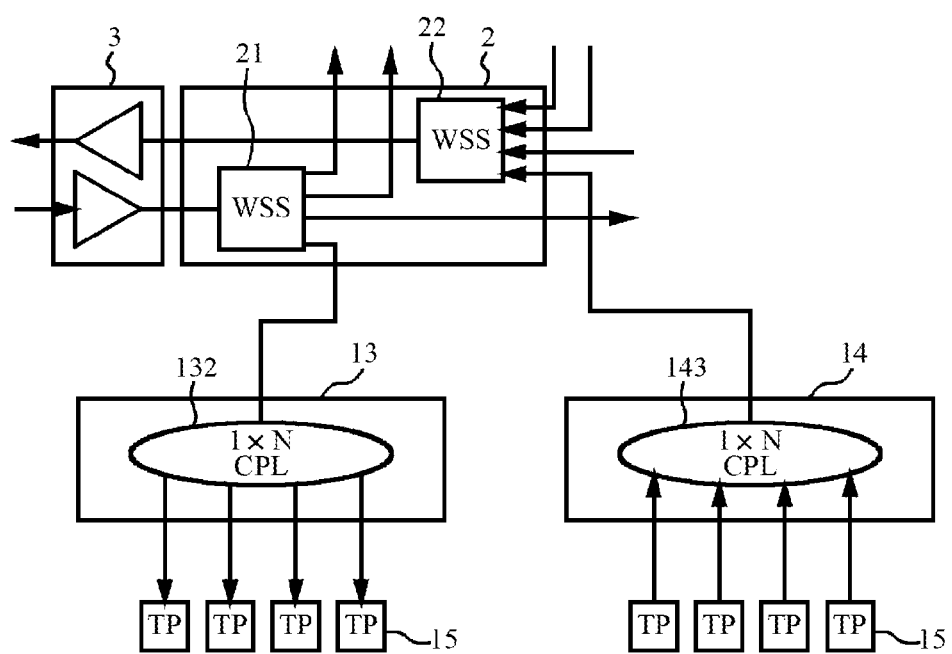
FIG. 8 is a configuration diagram illustrating configurations of an MUX unit and a DEMUX unit of a transmission device in accordance with a third comparative example.

FIG. 8 is a configuration diagram illustrating configurations of the MUX unit 14 and the DEMUX unit 13 of the transmission device 1 in accordance with a third comparative example. The transmission device 1 includes an economical optical coupler as a multiplexing unit instead of a high-cost wavelength selective switch. The MUX unit 14 and the DEMUX unit 13 respectively include 1×N-port optical couplers 143, 132.

The optical coupler 132 of the DEMUX unit 13 demultiplexes an input multiplexed optical signal from the input side wavelength selective switch 21, and outputs multiplexed optical signals obtained by demultiplexing to the optical transponders 15. Each of the optical transponders 15 demultiplexes the input multiplexed optical signal from the optical coupler 132 into optical signals and receives the optical signal of the corresponding wavelength. Each of the optical transponders 15 includes a filter to extract a desired wavelength light beam.

The optical coupler 143 of the MUX unit 14 receives optical signals of different wavelengths from the optical transponders 15. The optical coupler 143 multiplexes and outputs optical signals to the output side wavelength selective switch 22. At this point, crosstalk occurs between optical signals input to the optical coupler 143 as described hereinafter.

Figure 9:
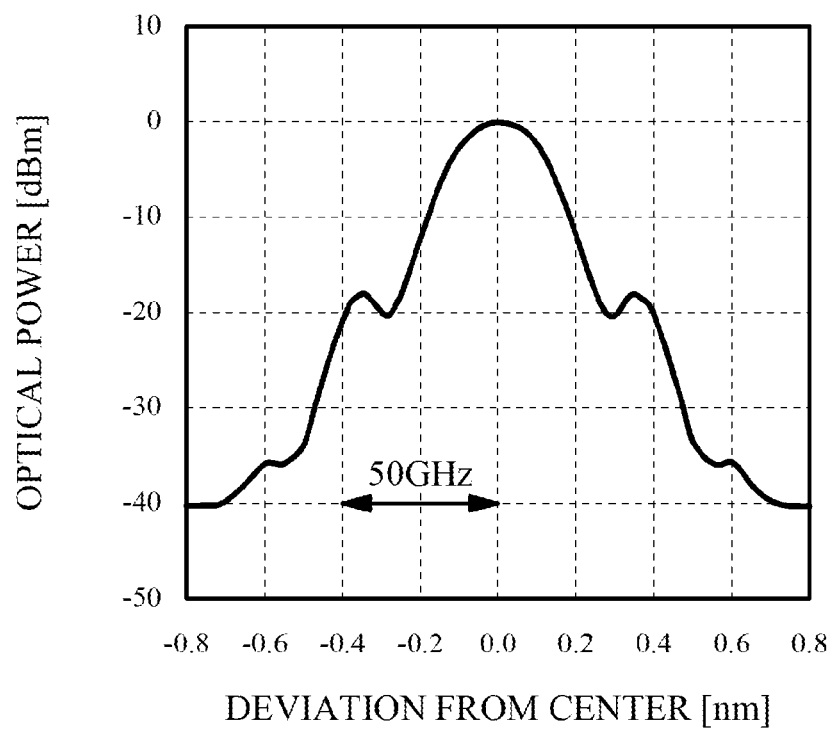
FIG. 9 is a waveform chart illustrating a spectral waveform of an optical signal of 100 (Gbps)

FIG. 9 is a waveform chart illustrating a spectral waveform of the optical signal of 100 (Gbps). As illustrated in FIG. 9, the optical signal of 100 (Gbps) has a spectral width of 100 (GHz).

Figure 10:
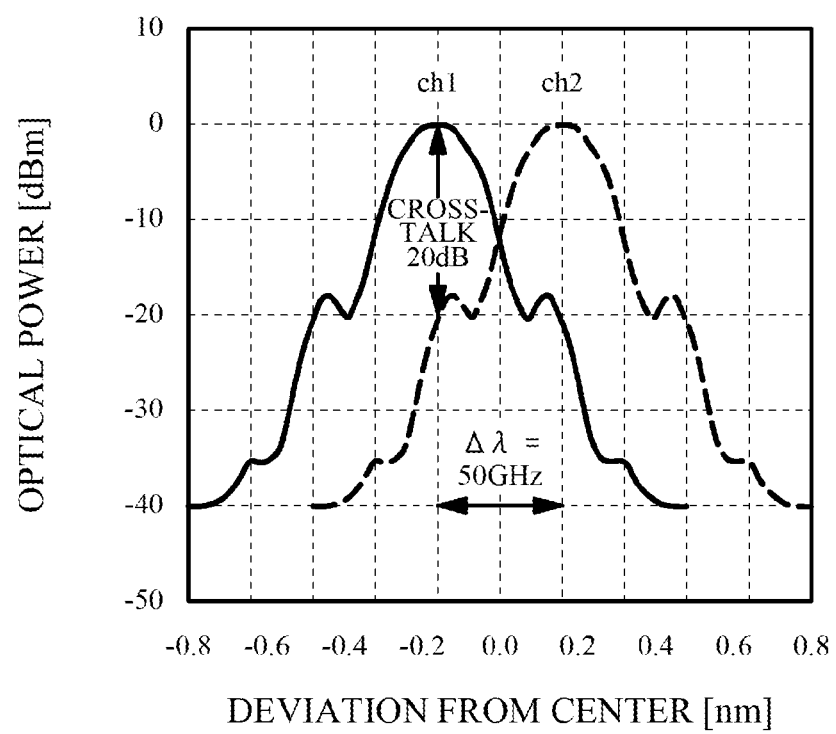
FIG. 10 is a waveform chart illustrating a spectral waveform when optical signals of adjoining channels are multiplexed.

FIG. 10 is a waveform chart illustrating a spectral waveform when optical signals of adjoining channels are multiplexed. The adjoining channels mean two channels of which the channel numbers assigned to wavelengths are continuing (see ch1, ch2).

A wavelength interval Δλ between the adjoining channels (difference between peaks) is 50 (GHz) when ITU-T grids are employed. ITU-T is International Telecommunication Union Telecommunication Standardization Sector. In this case, the optical signal of channel number ch1 and the optical signal of channel number ch2 interfere with each other by the side modes of their spectra (i.e. second largest peak), and cause crosstalk of approximately 20 (dB).

Figure 11:
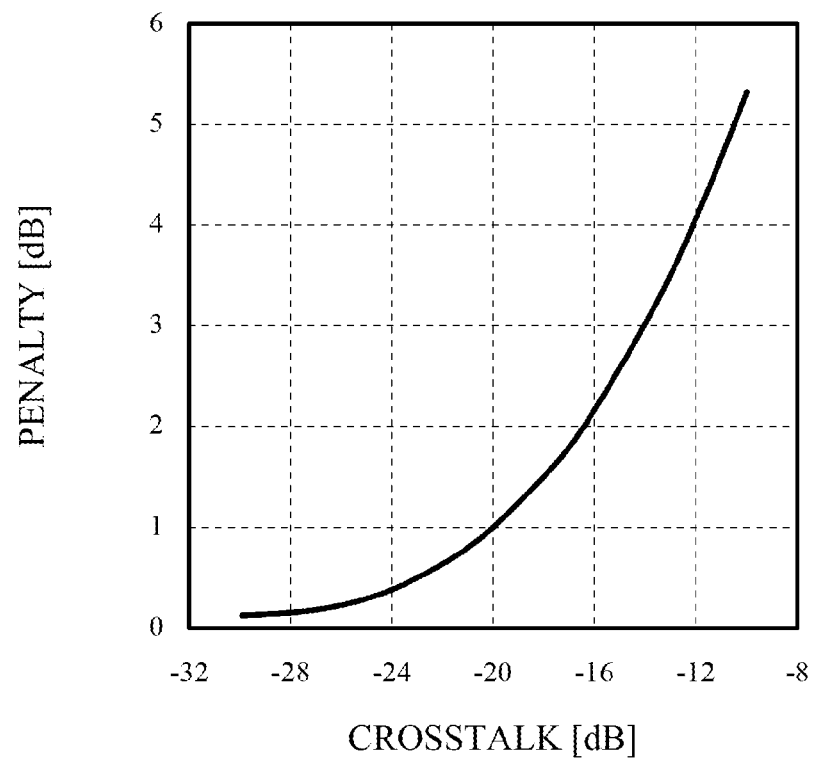
FIG. 11 is a graph illustrating a penalty with respect to the size of crosstalk.

The crosstalk deteriorates quality of optical signals. FIG. 11 is a graph illustrating a penalty with respect to the size of crosstalk. FIG. 11 demonstrates that the penalty of approximately 1 (dB) occurs when the crosstalk of approximately 20 (dB) occurs.

The crosstalk can be prevented by widening the wavelength interval between the adjoining channels to approximately 100~200 (GHz) for example. Widening the wavelength interval, however, decreases the number of wavelengths capable of being multiplexed, i.e. the number of optical signals capable being multiplexed, and thus the transmission efficiency decreases. Therefore, embodiments described hereinafter transmit optical signals, the wavelength interval Δλ between which is less than a predetermined value, to separate optical couplers, among optical signals of different wavelengths, in order to widen the wavelength interval between optical signals multiplexed by the optical couplers.

First Embodiment

Figure 12:
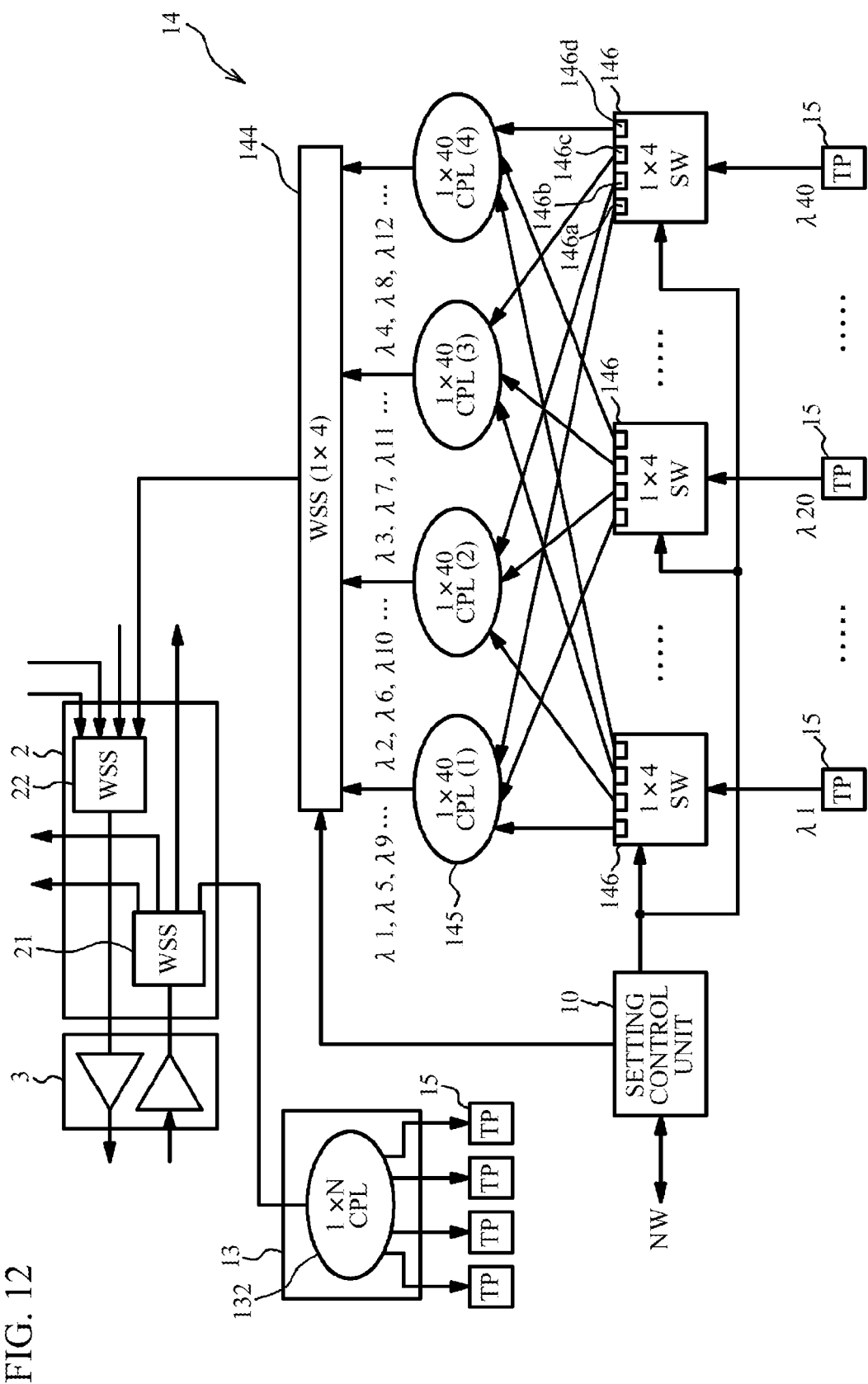
FIG. 12 is a configuration diagram illustrating configurations of an MUX unit and a DEMUX unit of a transmission device in accordance with a first embodiment.

FIG. 12 is a configuration diagram illustrating configurations of the MUX unit 14 and the DEMUX unit 13 of the transmission device 1 in accordance with a first embodiment. In FIG. 12, the common components are indicated by the same reference numerals as used for FIG. 8, and the description thereof is omitted.

The MUX unit 14 includes a wavelength selective switch 144, optical couplers (1)~(4) 145, and optical switches (selecting unit) 146. The present embodiment uses four optical couplers (1)~(4) 145 and forty optical switches 146 to add 40 waves of optical signals, but does not intend to suggest any limitations. The number of them may be determined in accordance with the number of optical signals to be added. For example, when 80 waves of optical signals are added, eight optical couplers 145 and eighty optical switches 146 may be provided.

The optical switches 146 are coupled to the optical transponders (optical transmitter) 15, and receive optical signals of wavelengths λ1~40. Further, each of the optical switches 146 includes four output ports 146a~146d respectively coupled to the optical couplers (1)~(4) 145.

Each of the optical switches 146 selects a destination of the optical signal, which is transmitted from the corresponding one of the optical transponders 15, from the optical couplers (1)~(4) 145. The optical switches 146 are, for example, optical switch elements, and switch among the output ports 146a~146d to output the optical signal in accordance with a control signal from the setting control unit 10.

The optical couplers (1)~(4) 145 multiplex optical signals transmitted from the optical transponders 15 through the optical switches 146. In the present embodiment, the optical couplers (1)~(4) 145 include 1×40 ports, and coupled to the wavelength selective switch 144 and the optical switches 146. Multiplexed optical signals obtained by multiplexing in the optical couplers (1)~(4) 145 are input to the wavelength selective switch 144.

The wavelength selective switch 144 includes 1×4 ports, and is coupled to the input side wavelength selective switch 22 and the optical couplers (1)~(4) 145. The wavelength selective switch 144 multiplexes and outputs multiplexed optical signals, which are obtained by multiplexing in the couplers (1)~(4) 145, to the input side wavelength selective switch 22.

The setting control unit 10 controls the optical switches 146 in accordance with an operation to the network management system 8 by an operator. This allows destinations of optical signals of wavelengths λ1~λ40 to be selected from the optical couplers (1)~(4) 145. The destination is selected so that optical signals, the wavelength interval between which is less than 200 (GHz), are transmitted to separate optical couplers of the optical couplers (1)~(4) 145. In other words, the optical switches 146 are controlled so that optical signals, the wavelength interval between which is less than 200 (GHz), are not transmitted to the same coupler of the optical couplers (1)~(4) 145.

In the present embodiment, channel numbers ch1~ch40 are assigned to wavelengths λ1~λ40 respectively, and 10 waves of optical signals are input to each of the optical couplers (1)~(4) 145 so that optical signals are input thereto every four channels. That is to say, optical signals of wavelengths λ1, λ5, λ9, . . . , λ37 are transmitted to the optical coupler (1) 145, and optical signals of wavelengths λ2, λ6, λ10, . . . , λ38 are transmitted to the optical coupler (2) 145. Moreover, optical signals of wavelengths λ3, λ7, λ11, . . . , λ39 are transmitted to the optical coupler (3) 145, and optical signals of wavelengths λ4, λ8, λ12, . . . , λ40 are transmitted to the optical coupler (4) 145.

As described above, a sufficient wavelength interval is secured between optical signals multiplexed in the optical couplers (1)~(4) 145 by transmitting optical signals, of which the channel numbers assigned to their wavelengths are continuing, to separate optical couplers of the optical couplers (1)~(4) 145. In the present embodiment, optical signals are input to the optical couplers (1)~(4) 145 every four channels, and thus the wavelength interval $\Delta\lambda$ is 200 (GHz). Therefore, the crosstalk illustrated in FIG. 10 does not occur.

Further, the wavelength selective switch 144 includes filters with respect to each wavelength, and thus each optical signal is not interfered by the side modes of the optical signals of other wavelengths, and therefore the crosstalk does not occur. The setting control unit 10 sets the wavelength to be selected by the wavelength selective switch 144.

As described above, the transmission device 1 of the present embodiment first multiplexes optical signals by the optical couplers 145 and then further multiplexes the multiplexed optical signals, which are obtained by multiplexing, by the wavelength selective switch 144 and transmits them to add optical signals. Therefore, the number of high-cost wavelength selective switches is made to be less than the number of economical optical couplers, and thus the device cost is reduced. The present embodiment describes a case where 40 waves of optical signals are added, but may apply to a case 80 waves or other numbers of waves of optical signals are added.

Second Embodiment

The first embodiment switches among the output ports 146a~146d of the optical switches 146 in accordance with an operation to the network management system 8 by an operator, but does not intend to suggest any limitation. The setting control unit 10 may control the optical switches 146 based on wavelengths $\lambda1$~$\lambda40$ of optical signals.

Figure 13:
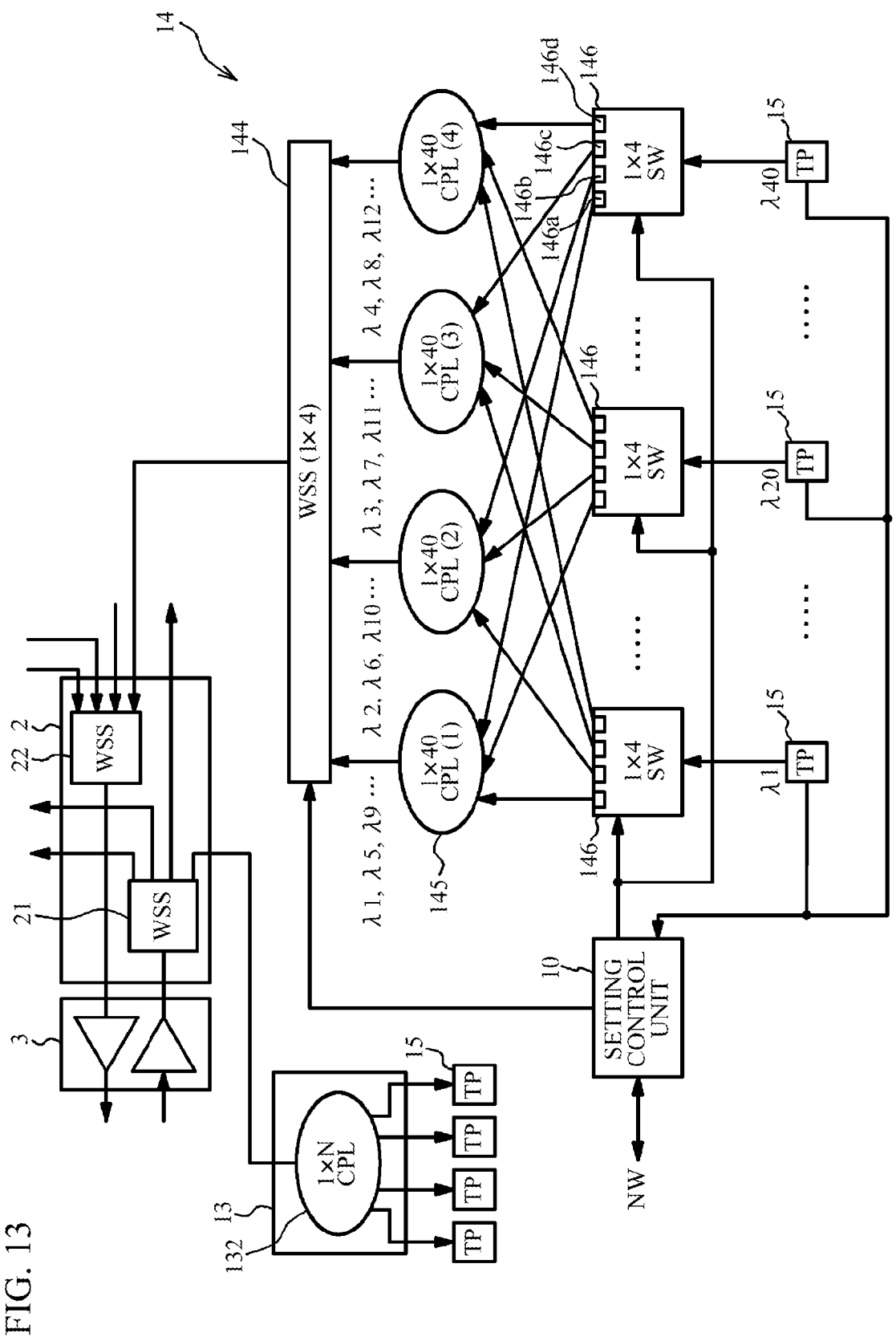
FIG. 13 is a configuration diagram illustrating configurations of an MUX unit and a DEMUX unit of a transmission device in accordance with a second embodiment.

FIG. 13 is a configuration diagram illustrating configurations of the MUX unit 14 and the DEMUX unit 13 of the transmission device 1 in accordance with a second embodiment. In FIG. 13, the common components are indicated by the same reference numerals as used for FIG. 12, and the description thereof is omitted.

The setting control unit 10 acquires wavelength information of optical signals from the optical transponders 15. The wavelength information is stored in a memory inside each optical transceiver 15 for example. The setting control unit 10 determines the channel number assigned to the wavelength indicated by the wavelength information by referring to a setting table stored in the storage unit 11. As illustrated in FIG. 14, the setting table is information presenting a correspondence relationship between channel numbers ch1~ch40 and wavelengths $\lambda1$~$\lambda40$.

The setting control unit 10 controls the optical switches 146 in accordance with channel numbers ch1~ch40 corresponding to the wavelengths. The setting control unit 10 controls switching of the output ports 146a~146d of the optical switches 146 so that optical signals are input to the optical couplers (1)~(4) 145 every four channels. This configures the wavelength interval $\Delta\lambda$ between optical signals multiplexed by the optical couplers (1)~(4) 145 to be 200 (GHz).

As described above, the setting control unit 10 controls the optical switches 146 based on wavelengths $\lambda1$~$\lambda40$ of optical signals. Thus, flexibility in setting the destinations of the optical signals is enhanced.

Third Embodiment

The second embodiment configures the setting control unit 10 to acquire wavelength information of optical signals from the optical transponders 15, but does not intend to suggest any limitation. The setting control unit 10 may acquire wavelength information from detectors that detect wavelengths $\lambda1$~$\lambda40$ of optical signals transmitted from the optical transponders 15.

Figure 15:
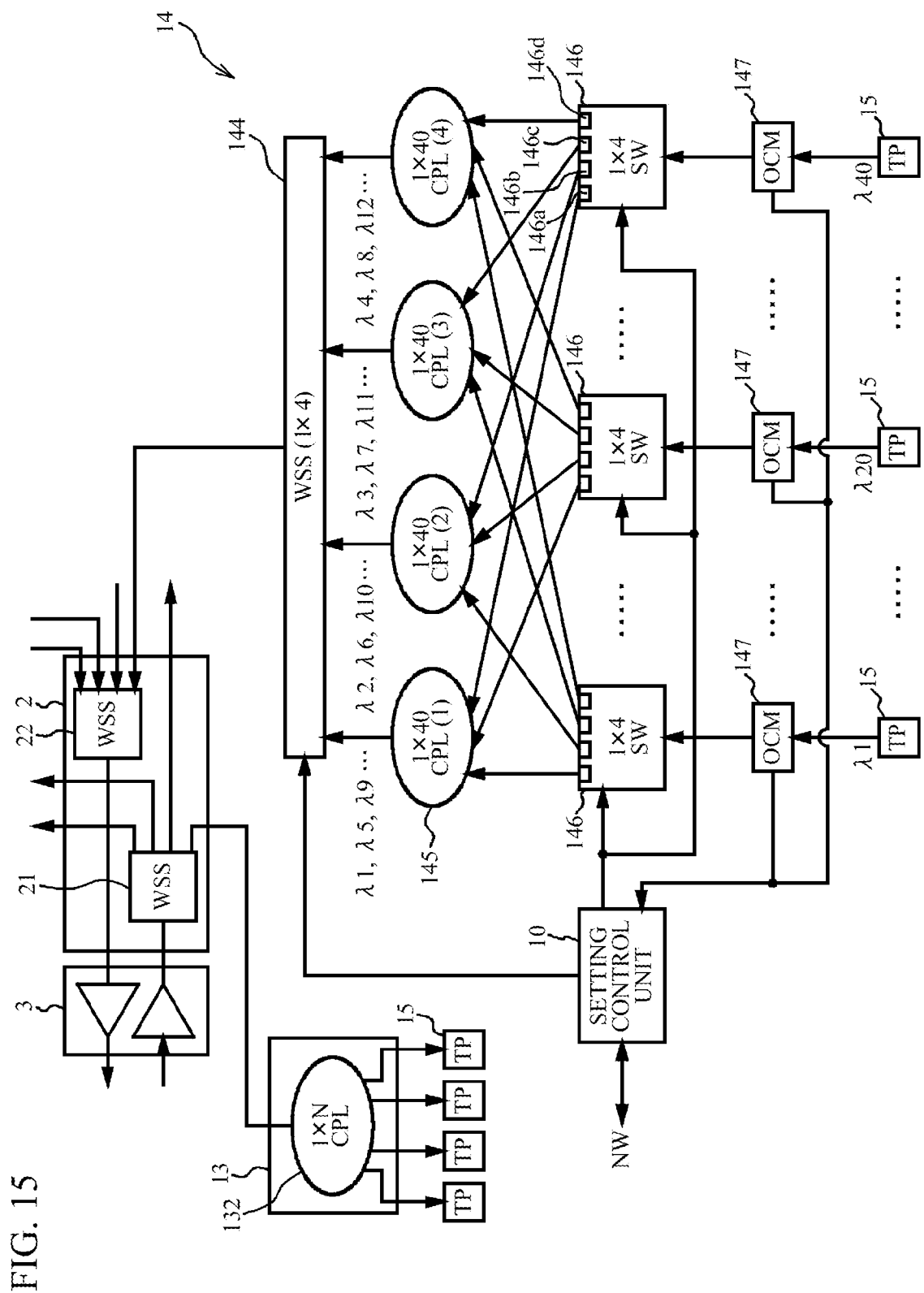
FIG. 15 is a configuration diagram illustrating configurations of an MUX unit and a DEMUX unit of a transmission device in accordance with the third embodiment.

FIG. 15 is a configuration diagram illustrating configurations of the MUX unit 14 and the DEMUX unit 13 of the transmission device 1 in accordance with a third embodiment. In FIG. 15, the common components are indicated by the same reference numerals as used for FIG. 12, and the description thereof is omitted.

The MUX unit 14 further includes Optical Channel Monitors (OCM) 147. The optical channel monitors (first detecting unit) 147 are located on waveguides between the optical switches 146 and the optical transponders 15, and include a multi-wavelength detector. The optical channel monitors 147 detect wavelengths $\lambda1$~$\lambda40$ of optical signals transmitted from the optical transponders 15, and notify the setting control unit 10 of the detected wavelengths $\lambda1$~$\lambda40$.

The setting control unit 10 determines channel numbers ch1~ch40 assigned to the detected wavelengths $\lambda1$~$\lambda40$ by referring to the setting table and controls the optical switches 146 as described in the second embodiment. As described above, the setting control unit 10 controls the optical switches 146 based on wavelengths $\lambda1$~$\lambda40$ detected by the optical channel monitors 147, and therefore flexibility in setting the destinations of optical signals is enhanced.

Fourth Embodiment

Figure 16:
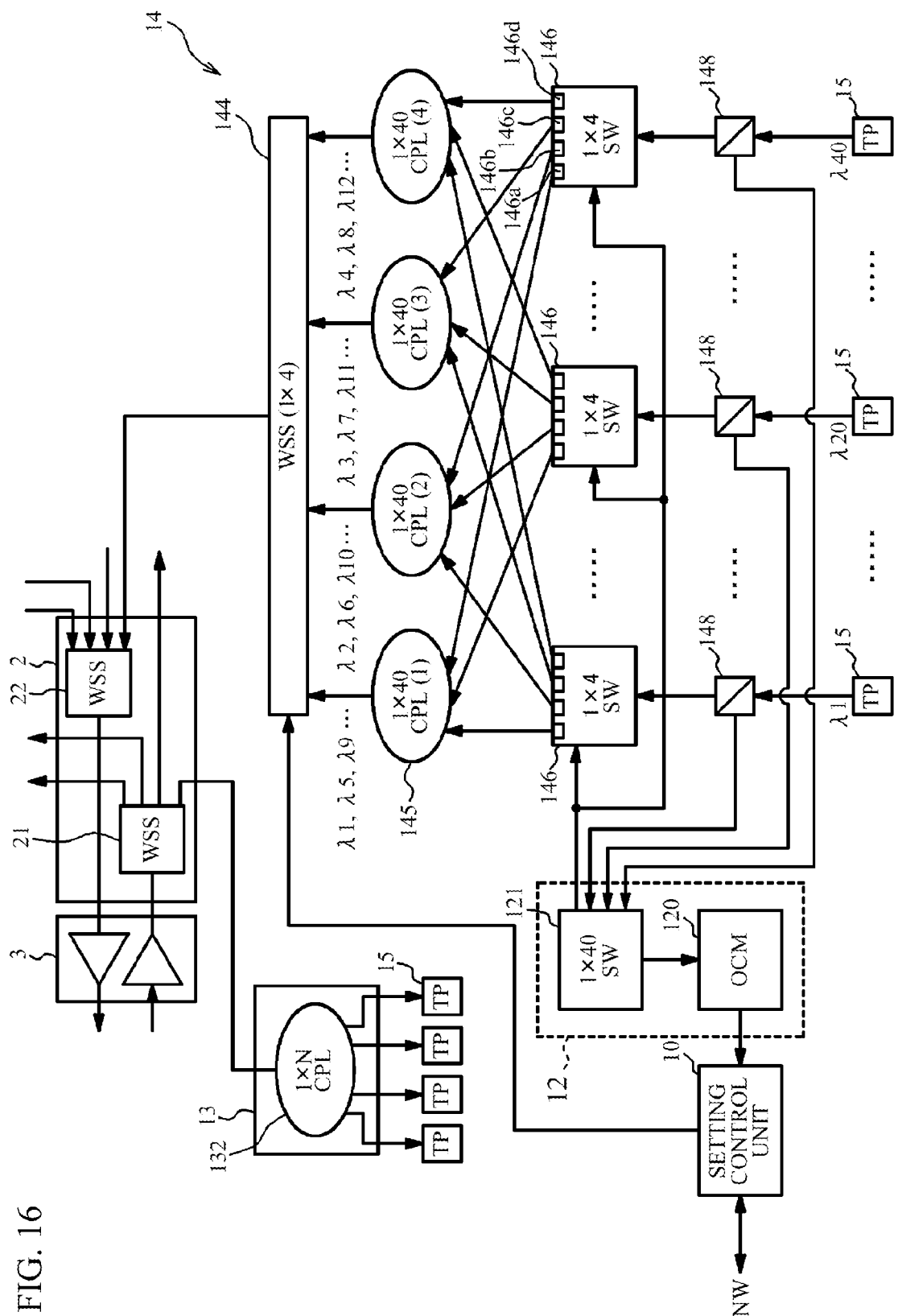
FIG. 16 is a configuration diagram illustrating configurations of an MUX unit and a DEMUX unit of a transmission device in accordance with a fourth embodiment.

The transmission device 1 of the third embodiment includes the same number of the optical channel monitors 147 as the number of wavelengths, i.e. the number of channel numbers ch1~ch40, but does not intend to suggest any limitation. FIG. 16 is a configuration diagram illustrating configurations of the MUX unit 14 and the DEMUX unit 13 of the transmission device 1 in accordance with a fourth embodiment. In FIG. 16, the common components are indicated by the same reference numerals as used for FIG. 12, and the description thereof is omitted.

The MUX unit 14 further includes a wavelength detecting unit (second detecting unit) 12 and demultiplexing units 148. The demultiplexing units 148 are, for example, optical splitters, and are located in waveguides between the optical switches 146 and the optical transponders 15.

The wavelength detecting unit 12 includes an optical channel monitor (OCM) 120 and a monitoring optical switch 121. The demultiplexing units 148 demultiplex optical signals transmitted from the optical transponders 15. Demultiplexed optical signals are input to the optical couplers 145 and the monitoring optical switch 121.

The monitoring optical switch 121 is a 1×40-port optical switch element, and sequentially selects optical signals and outputs them to the optical channel monitor 120 by switching an output port in accordance with the control of the setting control unit 10. The setting control unit 10 controls the monitoring optical switch 121 to select optical signals in ascending order or descending order of channel numbers ch1~ch40. The optical channel monitor 120 detects the wavelength of the selected optical signal, and notifies the setting control unit 10 of it as wavelength information. The setting control unit 10 controls the optical switches 146 based on the wavelength information as described above.

As described above, the setting control unit 10 sequentially acquires wavelength information of optical signals from the single optical channel monitor 120. Therefore the number of the optical channel monitors 120 is small compared to the third embodiment and the device cost is reduced.

Figure 17:
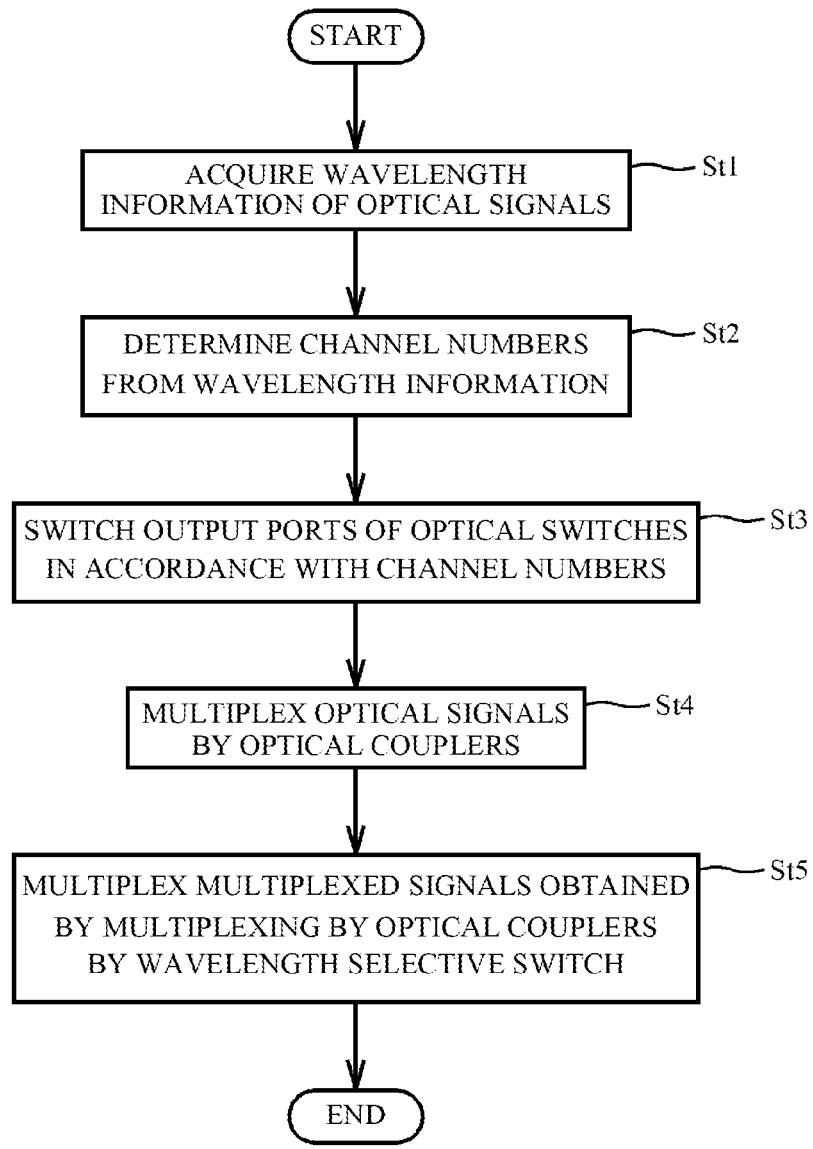
FIG. 17 is a flowchart illustrating a transmission method.

FIG. 17 is a flowchart illustrating a transmission method executed with use of the transmission device 1 described above. The setting control unit 10 first acquires wavelength information indicating wavelengths λ1~λ40 of optical signals (step St1). The wavelength information may be acquired from each of the optical transponders 15, or by the optical channel monitors 120, 147.

Then, the setting control unit 10 determines channel numbers ch1~ch40 from the wavelength information (step St2). At this point, the setting control unit 10 determines channel numbers ch1~ch40 corresponding to wavelengths λ1~λ40 indicated by the wavelength information by referring to the setting table illustrated in FIG. 14.

Then, the setting control unit 10 switches among the output ports 146*a*~146*d* of the optical switches 146 in accordance with channel numbers ch1~ch40 (step St3). That is to say, the processes at steps St1~St3 allow the setting control unit 10 to detect wavelengths λ1~λ40 of optical signals and select the destinations of the optical signals from the optical couplers (1)~(4) 145 based on the detected wavelengths. This enhances the flexibility in setting the destinations of the optical signals.

The optical signals are then multiplexed by the optical couplers (1)~(4) 145 (step St4). At this point, optical signals, the wavelength interval between which is less than 200 (GHz), are transmitted to separate optical couplers of the optical couplers (1)~(4) 145.

More specifically, optical signals, of which the channel numbers of channel numbers ch1~ch40 assigned to their wavelengths are continuing, are transmitted to separate optical couplers of the optical couplers (1)~(4) 145. Thus, a sufficient wavelength interval is secured between optical signals multiplexed in the optical couplers (1)~(4) 145, and the crosstalk illustrated in FIG. 10 does not Occur.

The multiplexed optical signals, which are obtained by multiplexing by the optical couplers (1)~(4) 145, are multiplexed by the wavelength selective switch 144 (step St5). As described above, the wavelength selective switch 144 includes filters with respect to each wavelength. Thus, each optical signal is not interfered by the side modes of optical signals of other wavelengths, and the crosstalk does not occur.

The multiplexed optical signal output from the wavelength selective switch 144 is multiplexed with other optical signals by the output side wavelength selective switch 22, and transmitted through the output side amplifier 31. The optical signals are transmitted as described above.

Fifth Embodiment

The above described embodiments transmit 10 waves of optical signals, the wavelength interval between which is 200 (GHz), to the optical couplers (1)~(4) 145, but do not intend to suggest any limitation. When the wavelength interval Δλ of 100 (GHz) is sufficient, optical signals, the wavelength interval Δλ between which is less than 100 (GHz), may be transmitted to separate optical couplers. The embodiment described hereinafter transmits optical signals of odd channel numbers (ch1, ch3, . . . , ch39) and optical signals of even channel numbers (ch2, ch4, . . . , ch40) to separate optical couplers.

Figure 18:
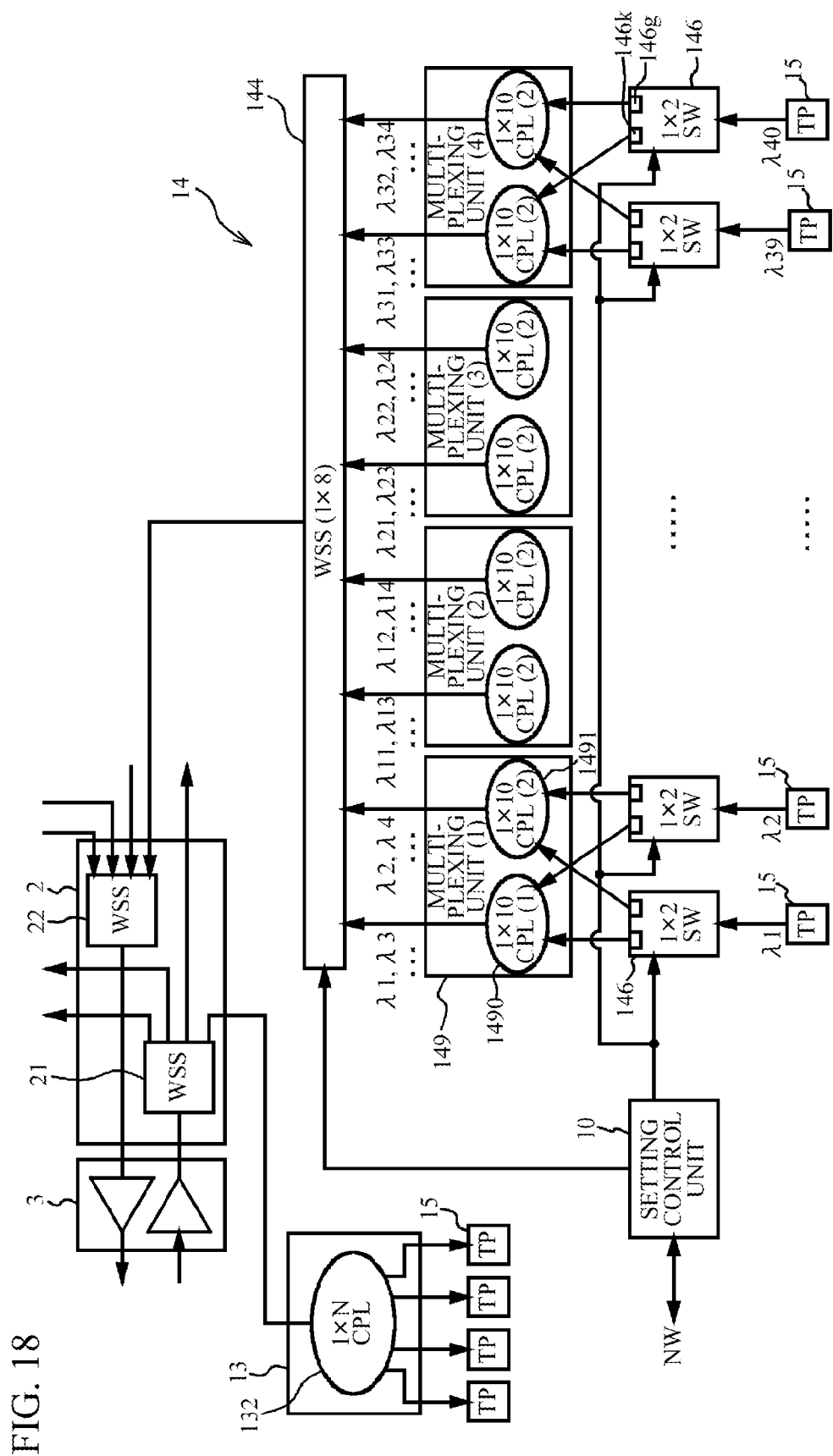
FIG. 18 is a configuration diagram illustrating configurations of an MUX unit and a DEMUX unit of a transmission device in accordance with a fifth embodiment.

FIG. 18 is a configuration diagram illustrating configurations of the MUX unit 14 and the DEMUX unit 13 of the transmission device 1 in accordance with the fifth embodiment. In FIG. 18, the common components are indicated by the same reference numerals as used for FIG. 12, and the description thereof is omitted.

The MUX unit 14 includes the wavelength selective switch 144, multiplexing units (1)~(4) 149, and optical switches (selecting unit) 146. The multiplexing units (1)~(4) 149 include a first optical coupler 1490 and a second optical coupler 1491. The first optical coupler 1490 and the second optical coupler 1491 include 1×10 ports, and are coupled to the wavelength selective switch 144 and ten optical switches 146.

The first optical coupler 1490 receives optical signals of odd channel numbers (ch1, ch3, . . . , ch39) while the second optical coupler 1491 receives optical signals of even channel numbers (ch2, ch4, . . . , ch40). Therefore, the first optical coupler 1490 multiplexes only optical signals of odd channel numbers while the second optical coupler 1491 multiplexes only optical signals of even channel numbers.

Each of the first optical coupler 1490 and the second optical coupler 1491 multiplexes five optical signals. More specifically, in the multiplexing unit (1), the first optical coupler 1490 multiplexes optical signals of channel numbers ch1, ch3, ch5, ch7, ch9, i.e. the optical signals of wavelengths λ1, λ3, λ5, λ7, λ9. The second optical coupler 1491 multiplexes optical signals of channel numbers ch2, ch4, ch6, ch8, ch10, i.e. optical signals of wavelengths λ2, λ4, λ6, λ8, λ10.

The multiplexed optical signals obtained by multiplexing by the first optical coupler 1490 and the second optical coupler 1491 are input to the wavelength selective switch 144. The wavelength selective switch 144 has 1×8 ports, and multiplexes and outputs the multiplexed optical signals, which are input from the multiplexing units (1)~(4) 149, to the output side wavelength selective switch 22.

The optical switches 146 are 1×2-port optical switch elements, and include a first output port 146*k* and a second output port 146*g*. The first output port 146*k* is a port to output optical signals of odd channel numbers and coupled to the first optical coupler 1490 while the second output port 146*g* is a port to output optical signals of even channel numbers and coupled to the second optical coupler 1491. The optical switches 146 switch between the first output port 146*k* and the second output port 146*g* to output the optical signal according to the control signal from the setting control unit 10.

The setting control unit 10 controls the optical switches 146 according to an operation to the network management system 8 by an operator. This allows the destinations of optical signals of wavelengths λ1~λ40 to be selected from the first optical coupler 1490 and the second optical coupler 1491. As described above, the destinations are selected so that optical signals of odd channel numbers (ch1, ch3, . . . , ch39) and optical signals of even channel numbers (ch2, ch4, . . . , ch40) are transmitted to separate optical couplers 1490, 1491.

Therefore, a sufficient wavelength interval is secured between optical signals multiplexed by the first optical coupler 1490 and the second optical coupler 1491. In the present embodiment, optical signals are input to the first optical coupler 1490 and the second optical coupler 1491 every two channels, and thus the wavelength interval is 100 (GHz).

Figure 19:
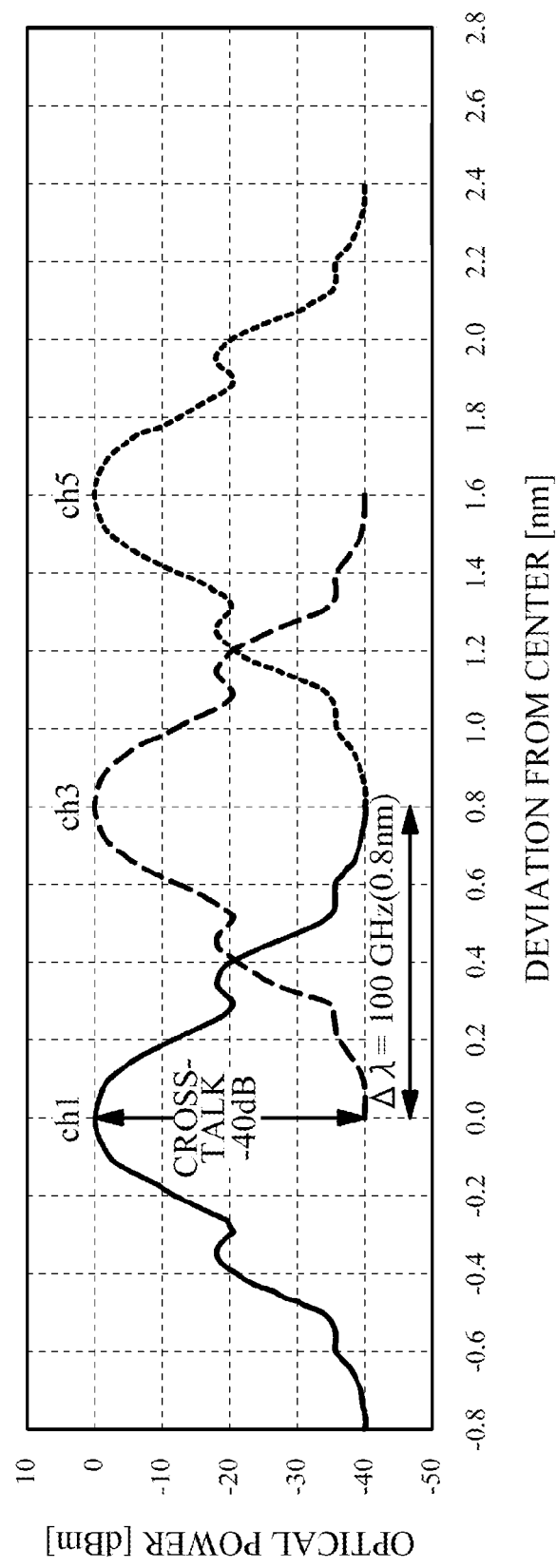
FIG. 19 is a waveform chart illustrating a spectral waveform when optical signals of odd channel numbers are multiplexed.
Figure 20:
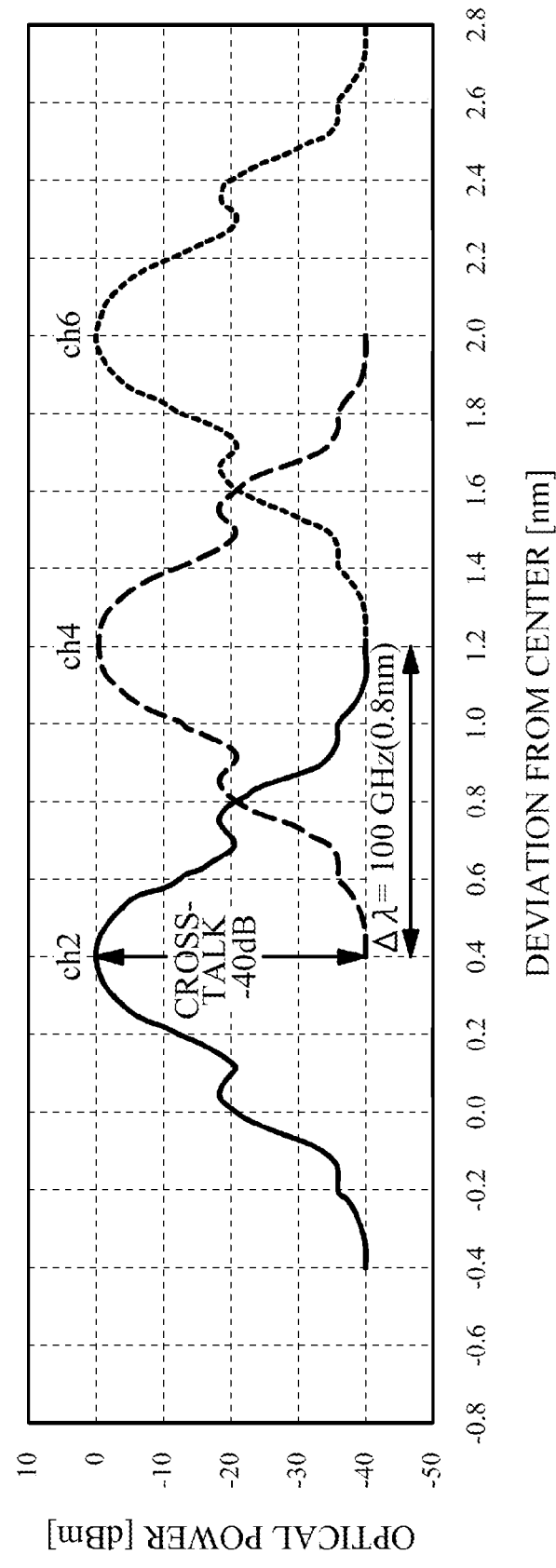
FIG. 20 is a waveform chart illustrating a spectral waveform when optical signals of even channel numbers are multiplexed.

FIG. 19 is a waveform chart illustrating a spectral waveform when optical signals of odd channel numbers are multiplexed. FIG. 20 is a waveform chart illustrating a spectral waveform when optical signals of even channel numbers are multiplexed. That is to say, FIG. 19 illustrates spectral waveforms of optical signals input to the first optical coupler 1490 and FIG. 20 illustrate spectral waveforms of optical signals input to the second optical coupler 1491. FIG. 19 and FIG. 20 demonstrate that the side lobe of each optical signal do not interfere with optical signals of other wavelengths by configuring the wavelength interval Δλ to be 100 (GHz). This reduces the size of crosstalk (by approximately −40 (dB)). The penalty at this point is approximately 0 (dB) as demonstrated in FIG. 11, and thus quality of optical signals is improved.

Sixth Embodiment

The fifth embodiment switches between the first output port 146k and the second output port 146g of each optical switch 146 in accordance with an operation to the network management system 8 by an operator, but does not intend to suggest any limitation. The setting control unit 10 may control the optical switches 146 based on wavelengths λ1~λ40 of optical signals as described in the second embodiment.

Figure 21:
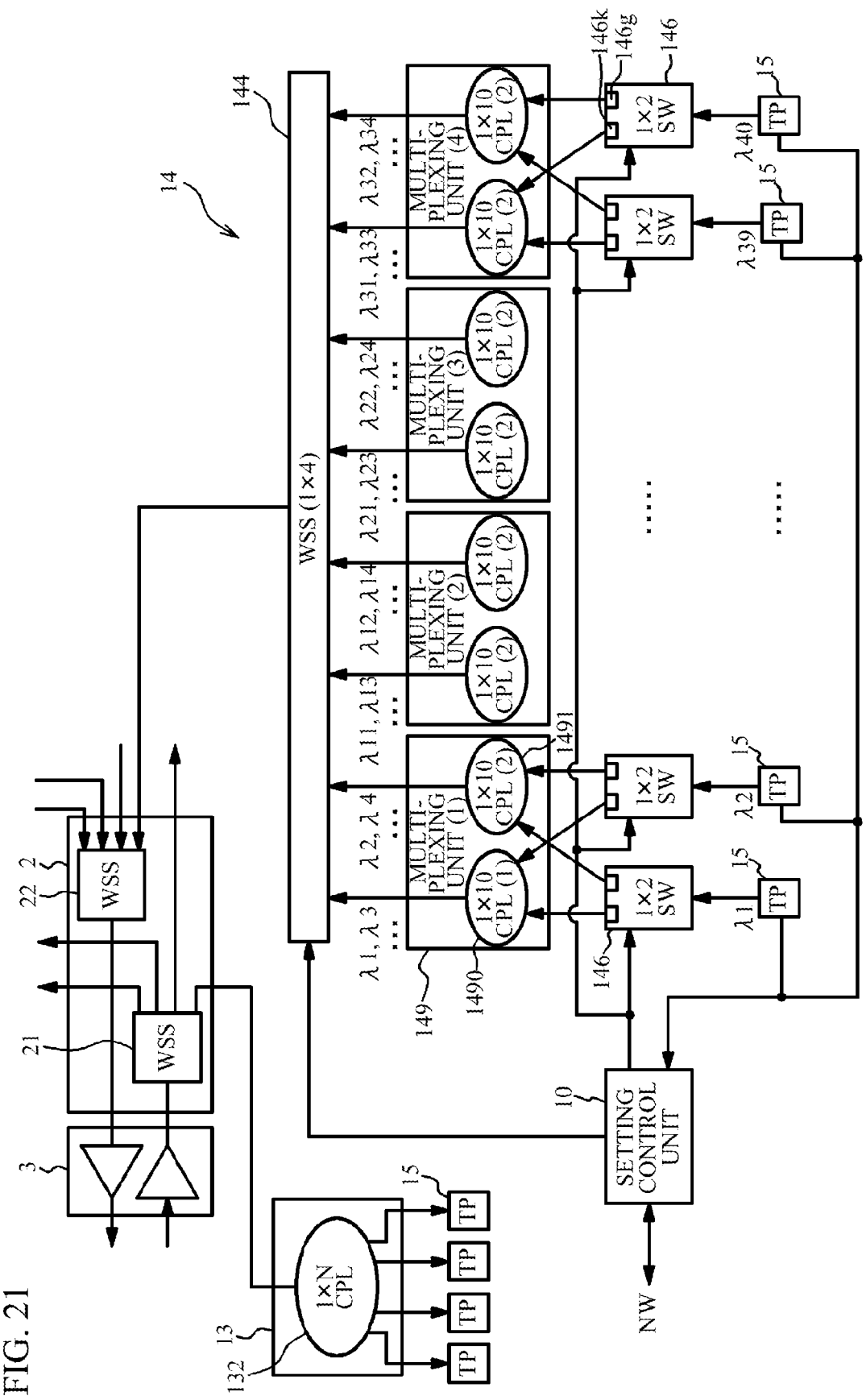
FIG. 21 is a configuration diagram illustrating configurations of an MUX unit and a DEMUX unit of a transmission device in accordance with a sixth embodiment.

FIG. 21 is a configuration diagram illustrating configurations of the MUX unit 14 and the DEMUX unit 13 of the transmission device 1 in accordance with the sixth embodiment. In FIG. 21, the common components are indicated by the same reference numerals as used for FIG. 13 and FIG. 18, and the description thereof is omitted.

The setting control unit 10 acquires wavelength information of optical signals from the optical transponders 15. The setting control unit 10 then determines the channel number assigned to the wavelength indicated by the wavelength information by referring to the setting table (see FIG. 14) stored in the storage unit 11.

The setting control unit 10 determines whether the channel number of channel numbers ch1~ch40 corresponding to the wavelength is an odd number or an even number, and controls the optical switches 146 based on the determination. The setting control unit 10 controls switching of the first and second output ports 146k, 146g of each optical switch 146 so that the first optical coupler 1490 receives optical signals of odd channel numbers and the second optical coupler 1491 receives optical signals of even channel numbers.

As described above, the setting control unit 10 controls the optical switches 146 based on wavelengths λ1~λ40 of optical signals, and thus flexibility in setting the destinations of optical signals is enhanced.

Seventh Embodiment

The sixth embodiment configures the setting control unit 10 to acquire the wavelength information of optical signal from the optical transponders 15, but does not intend to suggest any limitation. The setting control unit 10 may acquire the wavelength information by detectors that detect wavelengths λ1~λ40 of optical signals transmitted from the optical transponders 15 as described in the third embodiment.

Figure 22:
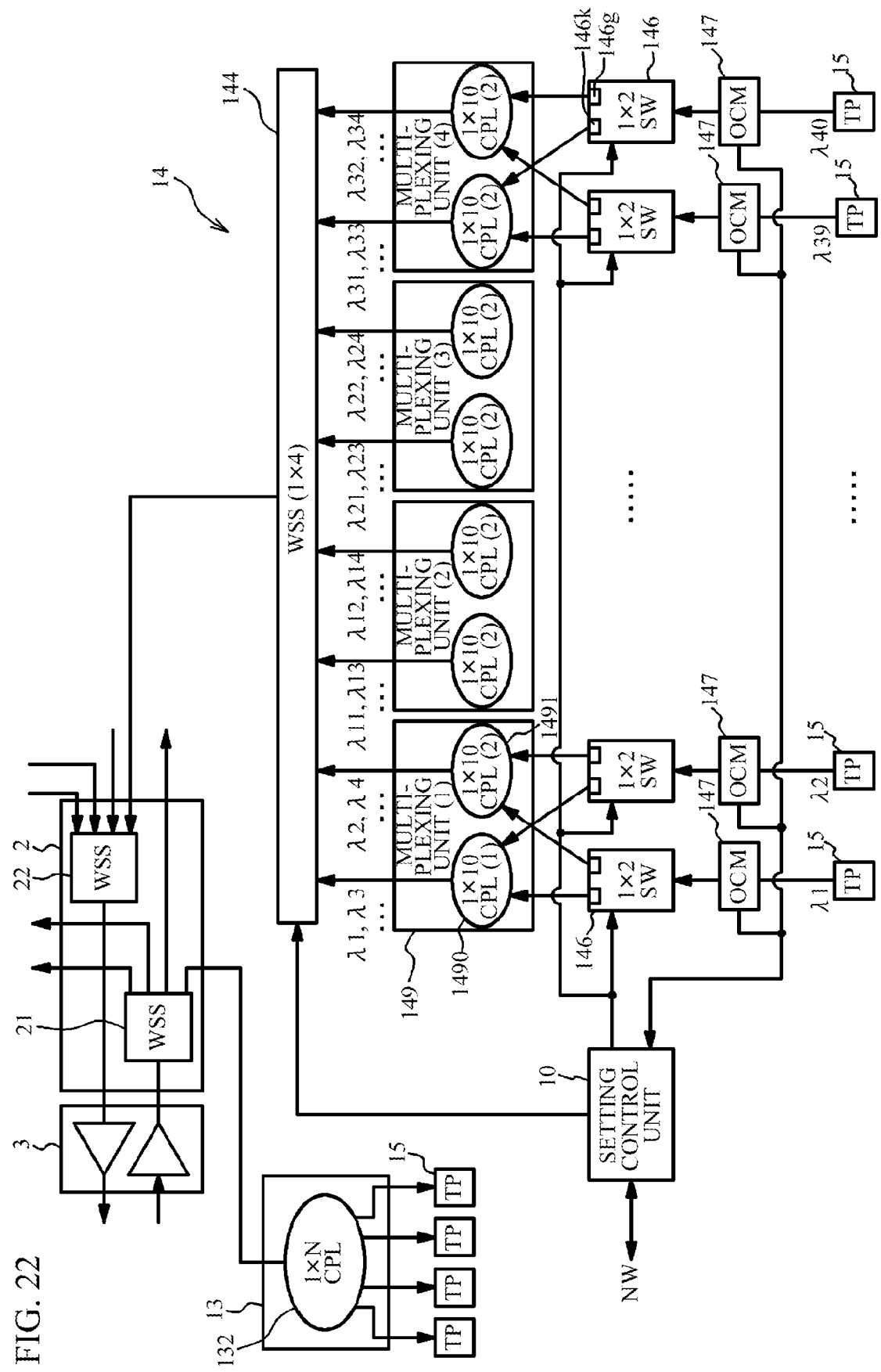
FIG. 22 is a configuration diagram illustrating configurations of an MUX unit and a DEMUX unit of a transmission device in accordance with a seventh embodiment.

FIG. 22 is a configuration diagram illustrating configurations of the MUX unit 14 and the DEMUX unit 13 of the transmission device 1 in accordance with a seventh embodiment. In FIG. 22, the common components are indicated by the same reference numerals as used for FIG. 15 and FIG. 18, and the description thereof is omitted.

The MUX unit 14 further includes optical channel monitors 147. The optical channel monitors 147 detect wavelengths λ1~λ40 of optical signals transmitted from the optical transponders 15, and notify the setting control unit 10 of the detected wavelengths λ1~λ40. The setting control unit 10 refers to the setting information to determine channel numbers ch1~ch40 assigned to the detected wavelengths λ1~λ40, and controls the optical switches 146.

As described above, the setting control unit 10 controls the optical switches 146 based on wavelengths λ1~λ40 detected by the optical channel monitors 147, and thus flexibility in setting the destinations of optical signals is enhanced.

Eighth Embodiment

Figure 23:
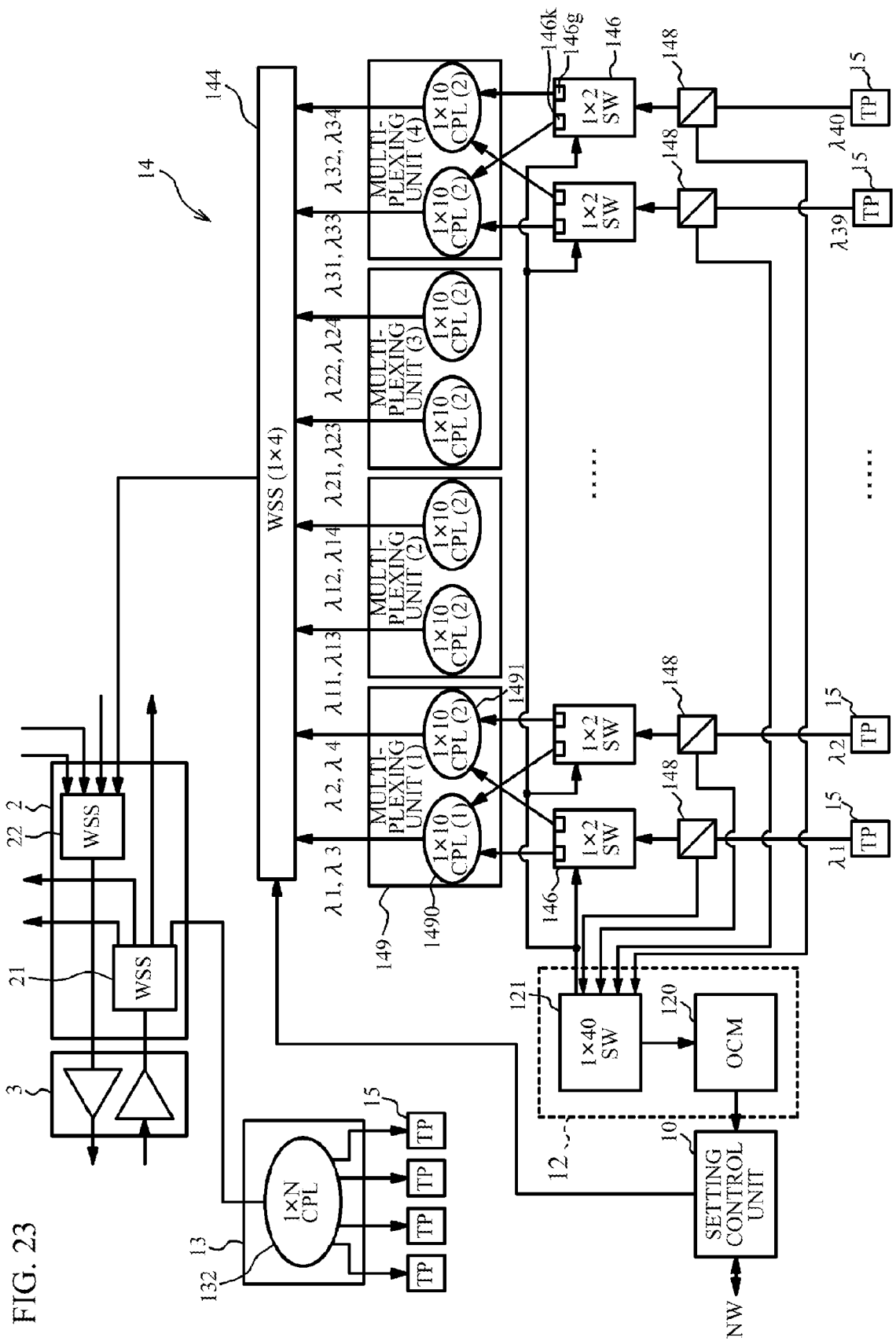
FIG. 23 is a configuration diagram illustrating configurations of an MUX unit and a DEMUX unit of a transmission device in accordance with an eighth embodiment.

The transmission device 1 of the seventh embodiment includes the same number of the optical channel monitors 147 as the number of wavelengths, i.e. the number of channel numbers, but does not intend to suggest any limitation. FIG. 23 is a configuration diagram illustrating configurations of the MUX unit 14 and the DEMUX unit 13 of the transmission device 1 in accordance with an eighth embodiment. In FIG. 23, the common components are indicated by the same reference numerals as used for FIG. 16 and FIG. 18, and the description thereof is omitted.

The MUX unit 14 further includes the wavelength detecting unit (second detecting unit) 12 and the demultiplexing units 148. The wavelength detecting unit 12 includes the optical channel monitor (OCM) 120 and the monitoring optical switch 121.

Optical signals demultiplexed by the demultiplexing units 148 are input to the optical couplers 1490, 1491 and the monitoring optical switch 121. The monitoring optical switch 121 sequentially selects optical signals according to the control from the setting control unit 10 and outputs them to the optical channel monitor 120. The optical channel monitor 120 detects the wavelength of the selected optical signal, and notifies the setting control unit 10 of it as the wavelength information. As described above, the setting control unit 10 controls the optical switches 146 based on the wavelength information.

As described above, the setting control unit 10 sequentially acquires the wavelength information of optical signals from one optical channel monitor 120, and thus the number of the optical channel monitors 120 is less than that of the seventh embodiment. The device cost is therefore reduced.

Figure 24:
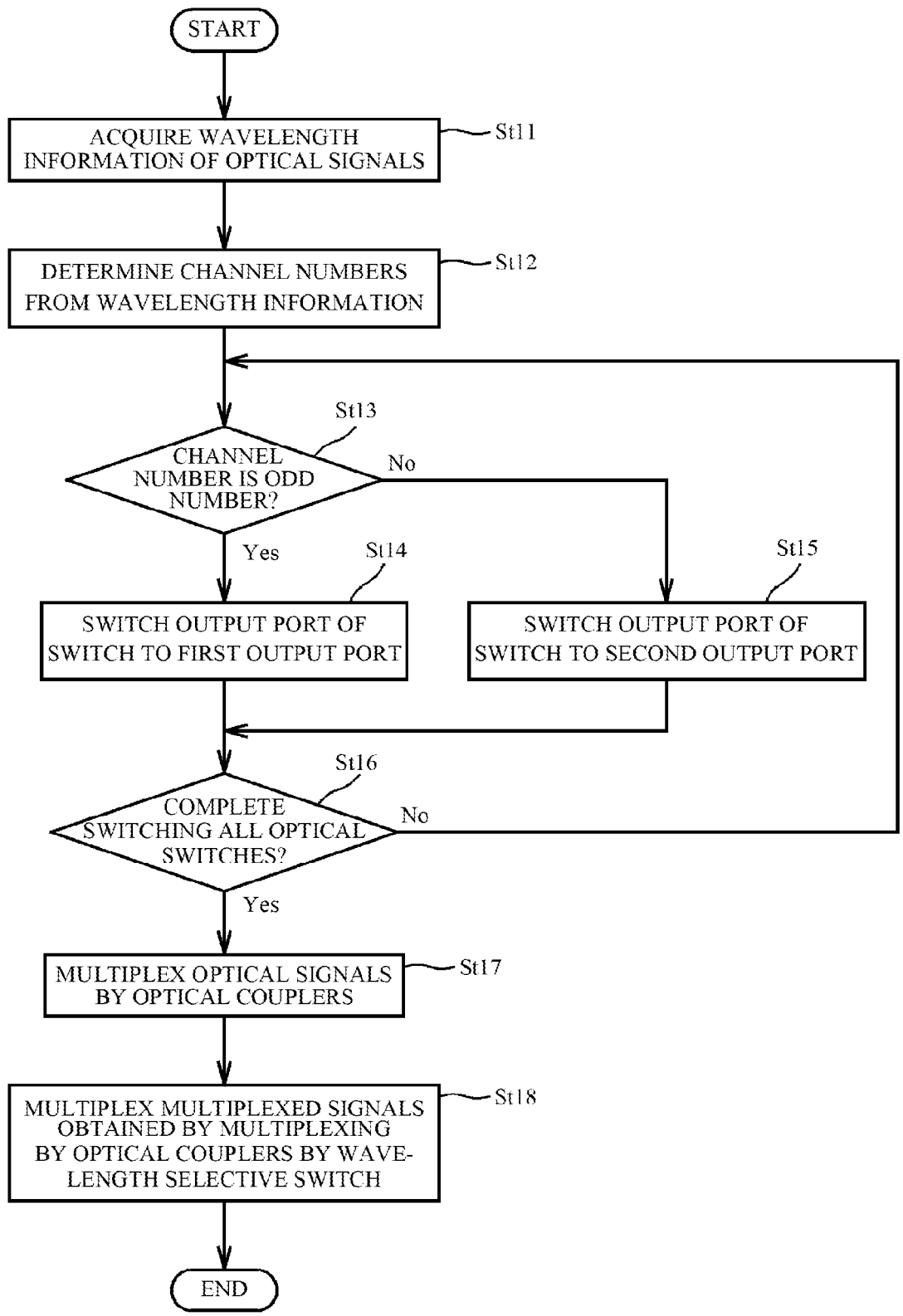
FIG. 24 is a flowchart illustrating an alternative transmission method.

FIG. 24 is a flowchart illustrating a transmission method using the above described transmission device 1. The setting control unit 10 first acquires wavelength information indicating wavelengths λ1~λ40 of optical signals (step St11). The setting control unit 10 then determines channel numbers ch1~ch40 from the wavelength information (step St12).

The setting control unit 10 then determines whether the channel number is an odd number (step st13). When the channel number is an odd number (step St13/YesS), the setting control unit 10 switches an output port of the optical switch 146 to the first output port 146k (step St14). On the other hand, when the channel number is not an odd number, i.e. when the channel number is an even number (step St13/No), the setting control unit 10 switches an output port of the optical switch 146 to the second output port 146g (step St15). This enables to transmit optical signals of odd channel numbers (ch1, ch3, . . . , ch39) and optical signals of even channel numbers (ch2, ch4, . . . , ch40) to separate optical couplers 1490, 1491. This configures the wavelength interval between optical signals input to the optical couplers 1490, 1491 to be 100 (GHz).

When the switching of the output ports of all the optical switches 146 are not completed (step St16/No), the setting control unit 10 executes the process from step St13. On the other hand, when the switching of the output ports of all the optical switches 146 are completed (step St16/Yes), optical signals are multiplexed by the first and second optical couplers 1490, 1491 of each multiplexing unit (1)~(4) 149 (step St17).

Then, the multiplexed optical signals, which are obtained by multiplexing in the multiplexing units (1)~(4) 149, are multiplexed by the wavelength selective switch 144 (step St18). The optical signals are transmitted as described above.

Variation of the Embodiments

Figure 25:
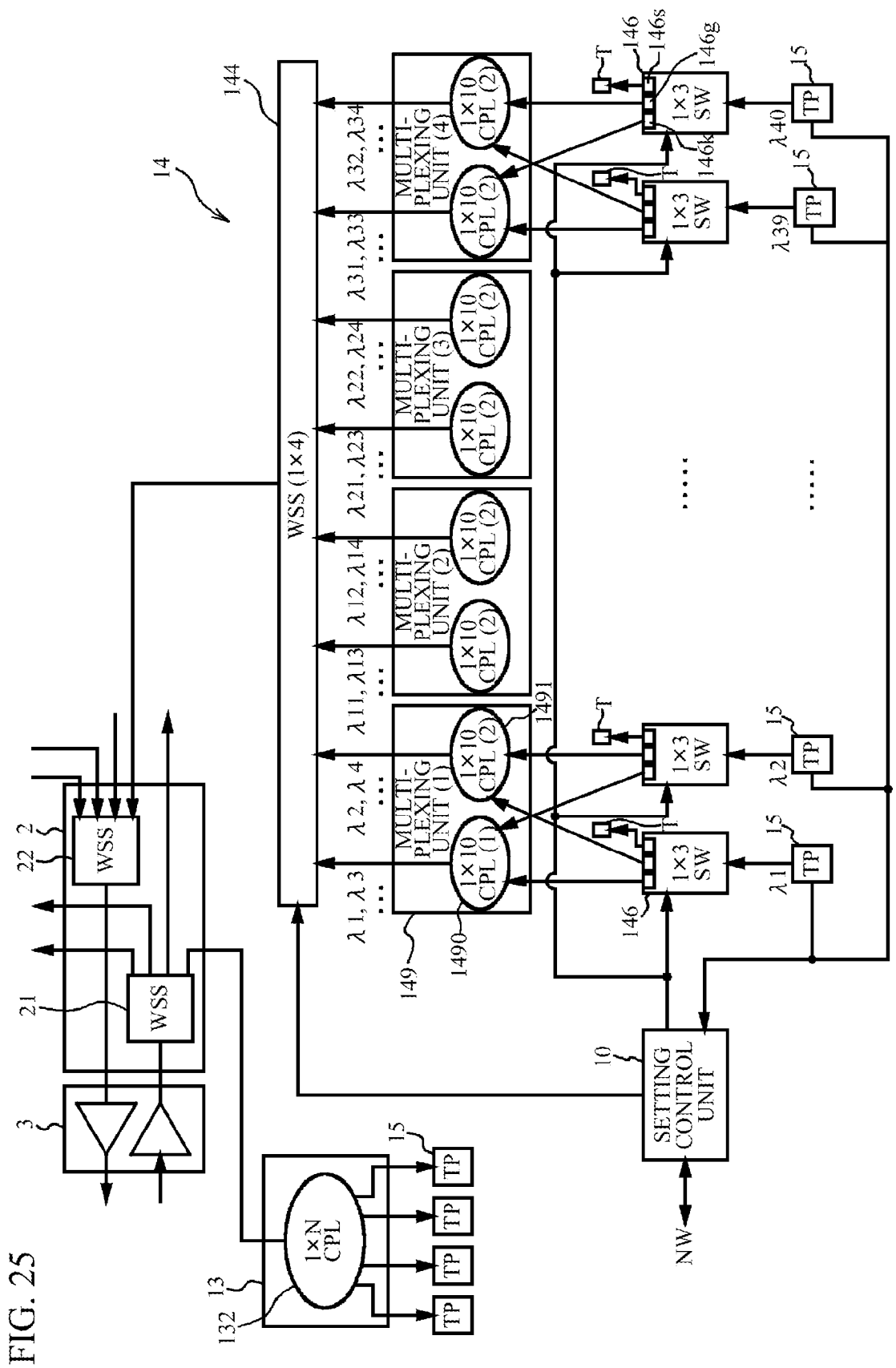
FIG. 25 is a configuration diagram illustrating a configuration of a variation of the transmission device illustrated in FIG. 21.

FIG. 25 is a configuration diagram of a variation of the transmission device 1 illustrated in FIG. 21 (sixth embodiment). In FIG. 25, the common components are indicated by the same reference numerals as used for FIG. 21, and the description thereof is omitted.

In the present variation, the optical switch 146 includes a third output port (shutter port) 146s in addition to the first and second output ports 146k, 146g. The third output port (shutter port) 146s is coupled to an optical terminator T.

The setting control unit 10 switches an output port of the optical switch 146 to the third output port 146s when the wavelength indicated by the acquired wavelength information is not registered in the setting table (see FIG. 14). This allows the optical signal of an wavelength not registered in the setting table to be output from the third output port 146s and terminated by the optical terminator T. Therefore, the optical signal of the wavelength not registered in the setting table is never transmitted to the network 80. The variation can be applied to other embodiments instead of the sixth embodiment.

As described above, the optical transponders 15 transmit optical signals of different wavelengths λ1~λ40, and the optical couplers 145, 1490, 1491 multiplex the optical signals transmitted from the optical transponders 15. Moreover, the wavelength selective switch 144 multiplexes the multiplexed optical signals obtained by multiplexing by the couplers 145. Further, optical signals, the wavelength interval between which is less than a predetermined value, are transmitted to separate optical couplers of the optical couplers 145, 1490, 1491, among the optical signals.

The transmission device 1 in accordance with the present embodiment first multiplexes optical signals by the optical couplers 145, 1490, 1491 and then further multiplexes the multiplex optical signals, which are obtained by the multiplexing, by the wavelength selective switch 144. Therefore, the number of high-cost wavelength selective switches can be made to be less than the number of economical optical couplers, and thus the device cost is reduced.

Moreover, optical signals, the wavelength interval Δλ between which is less than a predetermined value, are transmitted to separate optical couplers of the optical couplers 145, 1490, 1491, and thus the optical couplers 145, 1490, 1491 multiplex optical signals without causing the crosstalk that degrades quality of the optical signals. The wavelength selective switch 144 includes filters with respect to each wavelength, and thus does not cause the crosstalk when multiplexing the multiplexed optical signals obtained by multiplexing by the couplers 145. Therefore, the transmission device 1 of the present embodiment can transmit optical signals without degrading quality of the optical signals. The above described embodiments use 200 (GHz) and 100 (GHz) as a predetermined value of the wavelength interval Δλ, but does not intend to suggest any limitation, and may employ other values in accordance with the design.

The transmission method of the embodiment transmits optical signals, the wavelength interval between which is less than a predetermined value, to separate optical couplers of the optical couplers 145, 1490, 1491 among optical signals of different wavelengths, and multiplexes and transmits the multiplexed optical signals, which are obtained by multiplexing by the optical couplers, by the wavelength selective switch 144. Therefore, the transmission method of the embodiment can obtain the same advantages as the transmission device 1.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various change, substitutions, and alterations could be made hereto without departing from the spirit and scope of the invention.

What is claimed is:

1. A transmission device comprising:
    optical transmitters configured to transmit optical signals of different wavelengths;
    optical couplers configured to multiplexing the optical signals transmitted from the optical transmitters;
    a wavelength selective switch configured to multiplex multiplexed optical signals obtained by multiplexing by the optical couplers;
    selecting units configured to select destinations of the optical signals transmitted from the optical transmitters from the optical couplers; and
    a control unit configured to acquire wavelengths of the optical signals, determine channel numbers assigned to the wavelengths in continuous sequence from the wavelengths, and control the selecting units based on the channel numbers so that the optical signals of neighboring channel numbers are transmitted to separate optical couplers of the optical couplers.

2. The transmission device according to claim 1, wherein the control unit configured to control the selecting units so that an optical signal of which the channel number is an odd number and an optical signal of which the channel number is an even number are transmitted to separate optical couplers of the optical couplers, among the optical signals.

3. The transmission device according to claim 1, further comprising:
    detecting units configured to detect wavelengths of the optical signals transmitted from the optical transmitters and notify the control unit of detected wavelengths.

4. The transmission device according to claim 1, further comprising:
    a detecting unit configured to sequentially select the optical signals transmitted from the optical transmitters, detect a wavelength of a selected optical signal, and notify the control unit of a detected wavelength.

5. The transmission device according to claim 1, wherein the control unit controls the selecting units so that the optical signals of every predetermined channel numbers are transmitted to a common optical coupler of the optical couplers.

6. The transmission device according to claim 1, wherein the control unit acquires wavelength information indicating the wavelength of the optical signals from the optical transmitters.

7. A transmission method comprising:

transmitting optical signals from optical transmitter, multiplexing the optical signals transmitted from the optical transmitter by optical couplers, multiplexing multiplexed optical signals, which are obtained by multiplexing by the optical couplers, by a wavelength selective switch, selecting destinations of the optical signals transmitted from the optical transmitters from the optical couplers by selecting units, acquiring wavelengths of the optical signals, determining channel numbers assigned to the wavelengths in continuous sequence from the wavelengths; and controlling the selecting units based on the channel numbers so that the optical signals of neighboring channel numbers are transmitted to separate optical couplers of the optical couplers.

8. The transmission method according to claim 7, wherein controlling the selecting units so that an optical signal of which the channel number is an odd number and an optical signal of which the channel number is an even number are transmitted to separate optical couplers of the optical couplers, among the optical signals.

9. The transmission method according to claim 7, further comprising:

detecting wavelengths of the optical signals; and selecting destinations of the optical signals from the optical couplers based on detected wavelengths by the selecting units.

* * * * *